(12) United States Patent  
Ito et al.

(10) Patent No.: US 8,072,498 B2
(45) Date of Patent: Dec. 6, 2011

(54) IMAGE PROCESSING APPARATUS, IMAGE PROCESSING METHOD, AND COMPUTER PROGRAM

(75) Inventors: Atsushi Ito, Tokyo (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 11/913,167

(22) PCT Filed: Mar. 29, 2007

(86) PCT No.: PCT/JP2007/056804
§ 371 (c)(1),
(2), (4) Date: Oct. 30, 2007

(87) PCT Pub. No.: WO2007/114220
PCT Pub. Date: Oct. 11, 2007

(65) Prior Publication Data
US 2009/0207259 A1    Aug. 20, 2009

(30) Foreign Application Priority Data
Mar. 31, 2006    (JP) ................................ 2006-096792

(51) Int. Cl.
*H04N 5/228*    (2006.01)
(52) U.S. Cl. ............. 348/208.4; 348/208.6; 348/208.12
(58) Field of Classification Search ................... None
See application file for complete search history.

(56) References Cited

U.S. PATENT DOCUMENTS

| | | | | |
|---|---|---|---|---|
| 2002/0097324 A1* | 7/2002 | Onuki | ........................ | 348/208 |
| 2004/0201706 A1* | 10/2004 | Shimizu et al. | ............ | 348/208.4 |
| 2005/0018051 A1* | 1/2005 | Tomita et al. | .............. | 348/208.4 |
| 2005/0138569 A1 | 6/2005 | Baxter et al. | | |
| 2006/0023089 A1 | 2/2006 | Kobayashi | | |
| 2007/0019937 A1* | 1/2007 | Endo | .............................. | 396/52 |
| 2010/0277602 A1* | 11/2010 | Asano et al. | ............... | 348/208.4 |

FOREIGN PATENT DOCUMENTS

| | | |
|---|---|---|
| JP | 11-112939 | 4/1999 |
| JP | 2005-198268 | 7/2005 |
| JP | 2005-198269 | 7/2005 |
| WO | WO 01/35657 | 5/2001 |

OTHER PUBLICATIONS

Brostow, "Image-Based Motion Blur for Stop Motion Animation," SIGGRAPH 2001, Los Angeles, CA USA (6 pages).
Extended European Search Report, issued by European Patent Office, dated May 19, 2011, in an European Patent Application No. 07740242 (6 pages).

* cited by examiner

*Primary Examiner* — David L Ometz
*Assistant Examiner* — Dwight Alex C Tejano
(74) *Attorney, Agent, or Firm* — Finnegan, Henderson, Farabow, Garrett & Dunner, L.L.P.

(57) ABSTRACT

An apparatus and a method for outputting high-quality images in which both jerkiness and blur are reduced are provided. At generation of moving images to be output at a certain frame rate, movement velocities of a subject according to the frame rate of the output images are calculated in units of partial areas in each frame image constituting the moving images, optimal shutter speeds to reduce degradation of the output images are obtained as optimal imaging shutter speeds corresponding to the movement velocities in units of partial areas, images corresponding to the obtained optimal shutter speeds are generated in units of partial areas, and frame images generated by combining the generated partial area images are output. According to this configuration, high-quality images in which both jerkiness and blur are reduced can be output.

25 Claims, 24 Drawing Sheets

FIG. 16

| MOVEMENT VELOCITY | OPTIMAL SHUTTER SPEED |
|---|---|
| 0 TO Va | t4 |
| Va TO Vb | tk |
| Vb TO Vc | tl |
| Vc TO Vl | tm |
| Vl TO Vd | tn |
| Vd TO Ve | to |
| Ve TO Vf | tp |
| Vf TO Vg | tq |
| Vg TO Vh | tr |
| Vh OR MORE | ts |

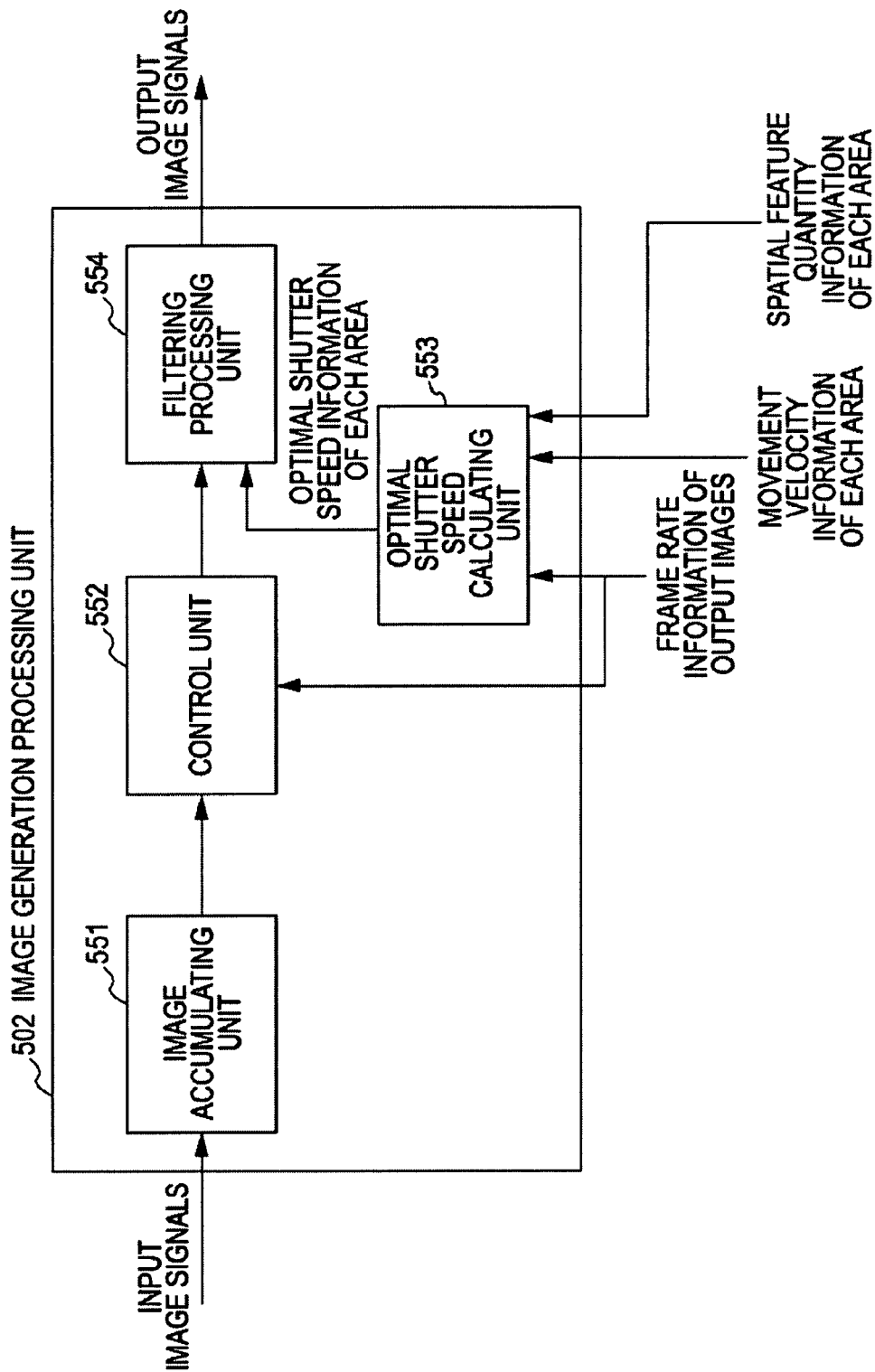

IMAGE PROCESSING APPARATUS, IMAGE PROCESSING METHOD, AND COMPUTER PROGRAM

TECHNICAL FIELD

The present invention relates to an image processing apparatus, an image processing method, and a computer program. Particularly, the present invention relates to an image processing apparatus, an image processing method, and a computer program for reducing degradation of image quality due to jerkiness and blur occurred in captured images of a moving subject, so as to generate high-quality output images.

BACKGROUND ART

When moving images or animation captured at a high shutter speed is displayed by using a display device, such as a project or a display, image degradation is often seen in which motion of a moving object in the images is discontinuously displayed and a viewer of the images perceives multiple images. This phenomenon is degradation of image quality typically called "jerkiness".

On the other hand, when moving images captured at a low shutter speed, such as an open shutter, are displayed, a loss of details of a subject or a blurred edge is often seen due to an effect of motion blur. This phenomenon is degradation of image quality called "blur".

Principles of occurrence of the jerkiness and blur are described below with reference to FIGS. 1 to 3. As a perceptual characteristic of the human, it is known that the human perceives light entered the eyes as a value integrated for a certain time period. FIGS. 1 to 3 illustrate simulations of how an object is viewed from a viewer based on this perceptual characteristic.

FIG. 1 illustrates an example of how a stationary object and a moving object are viewed in the real world.

In FIG. 1, (1) shows a temporal change of a stationary object 11 and a moving object 12, in which the horizontal axis indicates a position (x) and the vertical axis indicates time (t). In FIG. 1, (2) shows a simulation of a perceptual state of a viewer viewing the stationary object 11 and the moving object 12. The viewer views the moving object 12 by tracking it (tracking vision) or views the moving object 12 by fixing a viewpoint without tracking the object (fixed vision). Thus, there are perceptual states in two different viewing patterns. The two patterns are shown as: (a) tracking vision and (b) fixed vision.

As shown in (a) tracking vision in FIG. 1 (2), moving object perception information a12 indicates how the moving object 12 is viewed when the viewer views the moving object 12 by tracking it. This is the same as fixed object perception information b11 indicating how the fixed object 11 is viewed in (b) fixed vision in FIG. 1 (2). In this way, when the viewer views the moving object 12 by tracking it, how the moving object 12 is viewed for the viewer is the same as how the fixed object 11 is viewed in the fixed vision.

On the other hand, as shown in (b) fixed vision in FIG. 1 (2), moving object perception information b12 indicates how the moving object 12 is viewed when the viewer views the moving object 12 by fixing the viewpoint. In this case, the viewer percepts a change of the moving object that continuously moves, and the viewer does not feel unnaturalness.

FIG. 2 illustrates occurrence of jerkiness that is perceived by the viewer when moving images or animation captured at a high shutter speed is displayed by using a display device, such as a projector or a display. That is, the jerkiness is a phenomenon where motion of a moving object included in images is discontinuously displayed and the viewer viewing the images perceives multiple images.

FIG. 2 illustrates a simulation of a view from the viewer in a case where the moving object in the real world shown in FIG. 1 is captured by using a high shutter speed and the images thereof are displayed on a display device that is refreshed at 60 Hz. In FIG. 2, (1) shows a change in display position on the display device of a displayed stationary object 21 and a displayed moving object 22. The vertical axis indicates time (t), which is marked at refresh intervals (1/60 sec) of the display device. The horizontal axis indicates a display position (x).

In FIG. 2, (2) shows a simulation of a perceptual state of the viewer viewing the displayed stationary object 21 and the displayed moving object 22 displayed on the display device. The viewer views the displayed moving object 22 by tracking it (tracking vision) or views the displayed moving object 22 by fixing a viewpoint without tracking the object (fixed vision). Thus, there are perceptual states in two different viewing patterns. The two patterns are shown as: (a) tracking vision and (b) fixed vision.

As shown in FIG. 2 (2) (a), a view (a22) in a case where the viewer views the displayed moving object 22 displayed on the display device with the tracking vision is the same as the view (a12) of the tracking vision illustrated in FIG. 1 (2) (a). That is, the perception for the viewer is the same as in the case of viewing the stationary object with the fixed vision.

On the other hand, when the viewer views the displayed moving object 22 displayed on the display device with the fixed vision, the displayed moving object 22 perceived by the viewer's vision is different from that in the real world, but discrete (discontinuous) movement is viewed (b22), as shown in FIG. 2 (2) (b). As a result, the viewer perceives the moving object displayed on the display device as multiple images based on the perceptual characteristic that the human perceives light entered the eyes as a value integrated for a certain time period.

The viewer recognizes a single object as a plurality of objects disadvantageously. This phenomenon is called "degradation due to jerkiness". In principle, the degradation due to jerkiness is more likely to occur as the movement velocity of an object is higher. Also, the degradation due to jerkiness is more likely to occur as the frame rate on the display device is lower and is less likely to occur as the frame rate is higher. Furthermore, the degradation due to jerkiness is more likely to occur typically in a part where a change in spatial brightness is significant, in other words, a part where spatial contrast is high.

FIG. 3 illustrates occurrence of blur perceived by the viewer in a case where moving images or animation captured at a low shutter speed, such as an open shutter, is displayed by using a display device, such as a projector or a display. The blur is a phenomenon in which a loss of details of a subject or a blurred edge occurs due to an effect of motion blur.

FIG. 3 illustrates a simulation of a view from the viewer in a case where the moving object in the real world shown in FIG. 1 is captured by using a low shutter speed and the images thereof are displayed on a display device refreshed at 60 Hz. In FIG. 3, (1) shows a change in display positions on the display device of a displayed stationary object 31 and a displayed moving object 32. The vertical axis indicates time (t), which is marked at refresh intervals (1/60 sec) of the display device. The horizontal axis indicates a display position (x).

In FIG. 3, (2) shows a simulation of a perceptual state of the viewer viewing the displayed stationary object 31 and the displayed moving object 32 displayed on the display device.

The viewer views the displayed moving object 32 by tracking it (tracking vision) or views the displayed moving object 32 by fixing a viewpoint without tracking the object (fixed vision). Thus, there are perceptual states in two different viewing patterns. The two patterns are shown as: (a) tracking vision and (b) fixed vision.

As shown in FIG. 3 (2) (b), in a case where the viewer views the displayed moving object 32 displayed on the display device with the fixed vision (b32), the view is the same as that in the fixed vision (b12) shown in FIG. 1 (2) (b) described above with reference to FIG. 1. The viewer perceives that the moving object continuously moves and does not feel unnaturalness.

On the other hand, in a case where the viewer views the displayed moving object 32 with the tracking vision, the object is perceived by the viewer as a blurred image that is different from the fixed vision of the stationary object, as shown in a view (a32) in FIG. 3 (2) (a). This is because, as shown in the displayed moving object 32 in FIG. 3 (1), motion of the moving object during long exposure based on a low shutter speed is recorded in one frame during imaging, and this moving object is displayed in a band shape in one frame. This phenomenon is called "degradation due to blur".

As described above, occurrence of degradation due to jerkiness and occurrence of degradation due to blur are contradictory to each other regarding a shutter speed during imaging. Thus, degradation due to any of them is conspicuous when a simple shutter control is performed.

The jerkiness is known as degradation of image quality that is likely to occur when moving images are displayed by converting its frame rate to a frame rate different from that of original images. For example, as means for converting a high frame rate of original moving images to a lower frame rate so as to display the images, a method of simply thinning frames in accordance with the number of frames to be obtained is typically used. In this case, however, jerkiness is likely to occur because the original moving images are captured in short exposure.

As a method for suppressing the jerkiness that occurs at conversion of a frame rate, there is known a method for simply averaging frames of original moving images in accordance with the number of frames to be obtained, instead of converting the frame rate by thinning frames. This frame averaging method enables suppression of jerkiness. However, this method corresponds to generating images of a low frame rate or a low shutter speed due to the averaging based on images of a high frame rate corresponding to a high shutter speed. As a result, degradation due to blur is conspicuous disadvantageously.

On the other hand, in a case where a low frame rate of original moving images is converted to a higher frame rate, the simplest method is displaying existing adjacent frames a plurality of times for the frames that do not exist temporally. However, such frame rate conversion causes motion of a moving subject to be discrete, and thus jerkiness is likely to occur.

As a method for suppressing occurrence of jerkiness in the above-described case where a frame rate converting process is performed to generate images of a high frame rate based on original images of a low frame rate, there is known a method for generating frames that do not temporally exist by using motion compensation in interpolation so as to generate moving images of a high frame rate (for example, Patent Document 1). By using this method, degradation due to jerkiness can be reduced.

[Patent Document 1] Japanese Unexamined Patent Application Publication No. 11-112939

DISCLOSURE OF INVENTION

Problems to be Solved by Invention

As described above, occurrence of jerkiness and occurrence of blur are contradictory to each other regarding a shutter speed during imaging. Thus, degradation due to any of them is disadvantageously conspicuous when a simple shutter control is performed. At frame rate conversion, it is difficult in principle to suppress degradation due to both jerkiness and blur, as described above. If one of jerkiness and blur is suppressed, the other becomes conspicuous.

For example, when a low frame rate is converted to a high frame rate, degradation due to jerkiness that occurs when moving images are displayed can be reduced if the above-mentioned frame interpolation is performed and if the frame rate is converted to a considerably high frame rate. However, under the present circumstances, the frame rate is not sufficiently high in display of a standard moving image format of a film (24 frames per second) or television (50 or 60 frames per second), and thus there is a limit to reduce degradation due to jerkiness. Display devices capable of displaying moving images of a frame rate higher than that of a present television standard have not yet become widespread. Many of the presently-available display devices have a limit to improve image quality by frame interpolation.

The present invention has been made in view of the above-described problems and an object of the present invention is to provide an image processing apparatus, an image processing method, and a computer program that are capable of suppressing both jerkiness and blur, which are factors of degradation of moving image quality.

For example, an object of the present invention is to provide an image processing apparatus, an image processing method, and a computer program that are capable of generating and outputting high-quality image signals in which occurrence of both jerkiness and blur is suppressed to reduce degradation of image quality, by calculating interframe movement velocities and spatial feature quantities in units of partial areas of input image signals and performing an adaptive filtering process in units of areas based on the calculated movement velocities and spatial feature quantities.

Means for Solving the Problems

A first aspect of the present invention is an image processing apparatus to perform image processing on moving images. The image processing apparatus includes a movement velocity calculating unit to calculate movement velocities of a subject according to a frame rate of output images in units of partial areas in each frame image constituting the moving images; and an image generation processing unit to receive movement velocity information of the respective partial areas, obtain optimal imaging shutter speeds that correspond to the movement velocities and that reduce degradation of the output images in units of the partial areas, generate images corresponding to the obtained optimal shutter speeds in units of the partial areas, and output each frame image generated by combining the generated partial area images.

Furthermore, in an embodiment of the image processing apparatus according to the present invention, the movement velocity calculating unit performs a process of calculating movement velocities in units of the partial areas by using a block matching process applying a search frame and a reference frame that are selected from among frames of input images.

Furthermore, in an embodiment of the image processing apparatus according to the present invention, the movement velocity calculating unit includes a block matching unit to obtain motion vectors in units of the partial areas by using a block matching process applying a search frame and a reference frame that are selected from among frames of input images; and a motion vector standardizing unit to calculate movement velocities of a subject according to the frame rate of the output images based on motion vector information calculated in the block matching unit.

Furthermore, in an embodiment of the image processing apparatus according to the present invention, the movement velocity calculating unit performs a process of selecting the search frame from among the frames of the input images at frame intervals according to the frame rate of the output images.

Furthermore, in an embodiment of the image processing apparatus according to the present invention, the image generation processing unit holds a table associating movement velocities with imaging shutter speeds to reduce degradation of the output images and obtains optimal shutter speeds corresponding to respective movement velocities in units of the partial areas by referring to the table.

Furthermore, in an embodiment of the image processing apparatus according to the present invention, the table associates movement velocity zone information with optimal shutter speed information.

Furthermore, in an embodiment of the image processing apparatus according to the present invention, the image generation processing unit holds a plurality of different tables each indicating correspondence between movement velocities and optimal shutter speeds to reduce degradation of the output images and determines a table to be applied based on user selection information.

Furthermore, in an embodiment of the image processing apparatus according to the present invention, the image generation processing unit includes an optimal shutter speed calculating unit to calculate optimal shutter speeds corresponding to movement velocities in units of the partial areas; and a filtering processing unit to generate images corresponding to the optimal shutter speeds calculated by the optimal shutter speed calculating unit in units of the partial areas.

Furthermore, in an embodiment of the image processing apparatus according to the present invention, the filtering processing unit performs a process of generating images corresponding to the imaging shutter speeds calculated by the optimal shutter speed calculating unit in units of the partial areas based on a frame selected from among frames of input images.

Furthermore, in an embodiment of the image processing apparatus according to the present invention, the filtering processing unit performs a process of setting a weighting coefficient according to the optimal shutter speeds calculated by the optimal shutter speed calculating unit, performing weighted averaging of pixel values of a plurality of frames of input images, and determining pixel values of output image frames.

Furthermore, in an embodiment of the image processing apparatus according to the present invention, the image generation processing unit includes an intermediate frame generating unit to generate an intermediate frame that is not included in frames of input images, and performs a process of generating images corresponding to the optimal shutter speeds calculated by the optimal shutter speed calculating unit in units of the partial areas by applying the intermediate frame.

Furthermore, in an embodiment of the image processing apparatus according to the present invention, the image processing apparatus further includes a spatial feature quantity detecting unit to detect a level of spatial contrast in units of the partial areas. The image generation processing unit performs a process of setting a shutter speed higher than the optimal shutter speed calculated according to the movement velocity as an optimal shutter speed in the partial area where the spatial contrast is lower than a predetermined threshold.

Furthermore, in an embodiment of the image processing apparatus according to the present invention, the image processing apparatus further includes a spatial feature quantity detecting unit to detect a level of spatial contrast in units of the partial areas. The image generation processing unit performs a process of setting a shutter speed corresponding to a frame rate of input images as an optimal shutter speed without calculating an optimal shutter speed corresponding to the movement velocity in the partial area where the spatial contrast is lower than a predetermined threshold.

Furthermore, in an embodiment of the image processing apparatus according to the present invention, the degradation of the output images is degradation due to jerkiness and blur, and the image generation processing unit performs a process of obtaining optimal shutter speeds to reduce image degradation due to jerkiness and blur in units of the partial areas and generating images corresponding to the obtained optimal shutter speeds in units of the partial areas.

Furthermore, a second aspect of the present invention is an image processing method for performing image processing on moving images in an image processing apparatus. The image processing method includes a movement velocity calculating step of calculating movement velocities of a subject according to a frame rate of output images in units of partial areas in each frame image constituting the moving images, this step being performed in a movement velocity calculating unit; and an image generation processing step of receiving movement velocity information of the respective partial areas, obtaining optimal imaging shutter speeds that correspond to the movement velocities and that reduce degradation of the output images in units of the partial areas, generating images corresponding to the obtained optimal shutter speeds in units of the partial areas, and outputting each frame image generated by combining the generated partial area images, this step being performed in an image generation processing unit.

Furthermore, in an embodiment of the image processing method according to the present invention, the movement velocity calculating step performs a process of calculating movement velocities in units of the partial areas by using a block matching process applying a search frame and a reference frame that are selected from among frames of input images.

Furthermore, in an embodiment of the image processing method according to the present invention, the movement velocity calculating step includes a block matching step of obtaining motion vectors in units of the partial areas by using a block matching process applying a search frame and a reference frame that are selected from among frames of input images; and a motion vector standardizing step of calculating movement velocities of a subject according to the frame rate of the output images based on motion vector information calculated in the block matching step.

Furthermore, in an embodiment of the image processing method according to the present invention, the movement velocity calculating step performs a process of selecting the search frame from among the frames of the input images at frame intervals according to the frame rate of the output images.

Furthermore, in an embodiment of the image processing method according to the present invention, the image generation processing step includes a step of obtaining optimal shutter speeds corresponding to respective movement velocities in units of the partial areas by referring to a table associating the movement velocities with the imaging shutter speeds to reduce degradation of the output images.

Furthermore, in an embodiment of the image processing method according to the present invention, the table associates movement velocity zone information with optimal shutter speed information.

Furthermore, in an embodiment of the image processing method according to the present invention, the image generation processing step includes a step of performing a process of determining a table to be applied based on user selection information, among a plurality of different tables each indicating correspondence between movement velocities and optimal shutter speeds to reduce degradation of the output images.

Furthermore, in an embodiment of the image processing method according to the present invention, the image generation processing step includes an optimal shutter speed calculating step of calculating optimal shutter speeds corresponding to movement velocities in units of the partial areas; and a filtering processing step of generating images corresponding to the optimal shutter speeds calculated in the optimal shutter speed calculating step in units of the partial areas.

Furthermore, in an embodiment of the image processing method according to the present invention, the filtering processing step performs a process of generating images corresponding to the imaging shutter speeds calculated in the optimal shutter speed calculating step in units of the partial areas based on a frame selected from among frames of input images.

Furthermore, in an embodiment of the image processing method according to the present invention, the filtering processing step performs a process of setting a weighting coefficient according to the optimal shutter speeds calculated in the optimal shutter speed calculating step, performing weighted averaging of pixel values of a plurality of frames of input images, and determining pixel values of output image frames.

Furthermore, in an embodiment of the image processing method according to the present invention, the image generation processing step performs a process of generating an intermediate frame that is not included in frames of input images, and generating images corresponding to the optimal shutter speeds calculated in the optimal shutter speed calculating step in units of the partial areas by applying the intermediate frame.

Furthermore, in an embodiment of the image processing method according to the present invention, the image processing method further includes a spatial feature quantity detecting step of detecting a level of spatial contrast in units of the partial areas, this step being performed in a spatial feature quantity detecting unit. The image generation processing step performs a process of setting a shutter speed higher than the optimal shutter speed calculated according to the movement velocity as an optimal shutter speed in the partial area where the spatial contrast is lower than a predetermined threshold.

Furthermore, in an embodiment of the image processing method according to the present invention, the image processing method further includes a spatial feature quantity detecting step of detecting a level of spatial contrast in units of the partial areas, this step being performed in a spatial feature quantity detecting unit. The image generation processing step performs a process of setting a shutter speed corresponding to a frame rate of input images as an optimal shutter speed without calculating an optimal shutter speed corresponding to the movement velocity in the partial area where the spatial contrast is lower than a predetermined threshold.

Furthermore, in an embodiment of the image processing method according to the present invention, the degradation of the output images is degradation due to jerkiness and blur, and the image generation processing step performs a process of obtaining optimal shutter speeds to reduce image degradation due to jerkiness and blur in units of the partial areas and generating images corresponding to the obtained optimal shutter speeds in units of the partial areas.

Furthermore, a third aspect of the present invention is a computer program allowing an image processing apparatus to perform image processing on moving images. The program allows the apparatus to perform a movement velocity calculating step of calculating movement velocities of a subject according to a frame rate of output images in units of partial areas in each frame image constituting the moving images, this step being performed in a movement velocity calculating unit; and an image generation processing step of receiving movement velocity information of the respective partial areas, obtaining optimal imaging shutter speeds that correspond to the movement velocities and that reduce degradation of the output images in units of the partial areas, generating images corresponding the obtained optimal shutter speeds in units of the partial areas, and outputting each frame image generated by combining the generated partial area images, this step being performed in an image generation processing unit.

The computer program according to the present invention is a computer program that can be provided to a multi-purpose computer system capable of executing various program codes via a computer-readable storage medium or communication medium, for example, a storage medium including a CD, an FD, and an MO, or a communication medium including a network. By providing the program in a computer readable manner, a process according to the program is realized in the computer system.

Other objects, features, and advantages of the present invention will become apparent from the following description based on embodiments of the present invention and the attached drawings. In this description, a system means a logical set of a plurality of devices, and the devices of respective configurations are not always in the same casing.

Advantages

According to the configuration of the present invention, at generation of moving images to be output at a certain frame rate, movement velocities of a subject according to the frame rate of the output images are calculated in units of partial areas in each frame image constituting the moving images, optimal shutter speeds to reduce degradation of the output images are obtained as optimal imaging shutter speeds corresponding to the movement velocities in units of partial areas, images corresponding to the obtained optimal shutter speeds are generated in units of partial areas, and frame images generated by combining the generated partial area images are output. With this configuration, high-quality images in which degradation in output images is reduced, specifically, both jerkiness and blur are reduced, can be output.

BRIEF DESCRIPTION OF THE DRAWINGS

FIG. 16 shows a roughened correspondence data configuration of the example of the relationship between movement velocities and optimal imaging shutter speeds.

FIG. 24 illustrates a configuration and a process of an image generation processing unit.

BEST MODE FOR CARRYING OUT THE INVENTION

Figure 1:
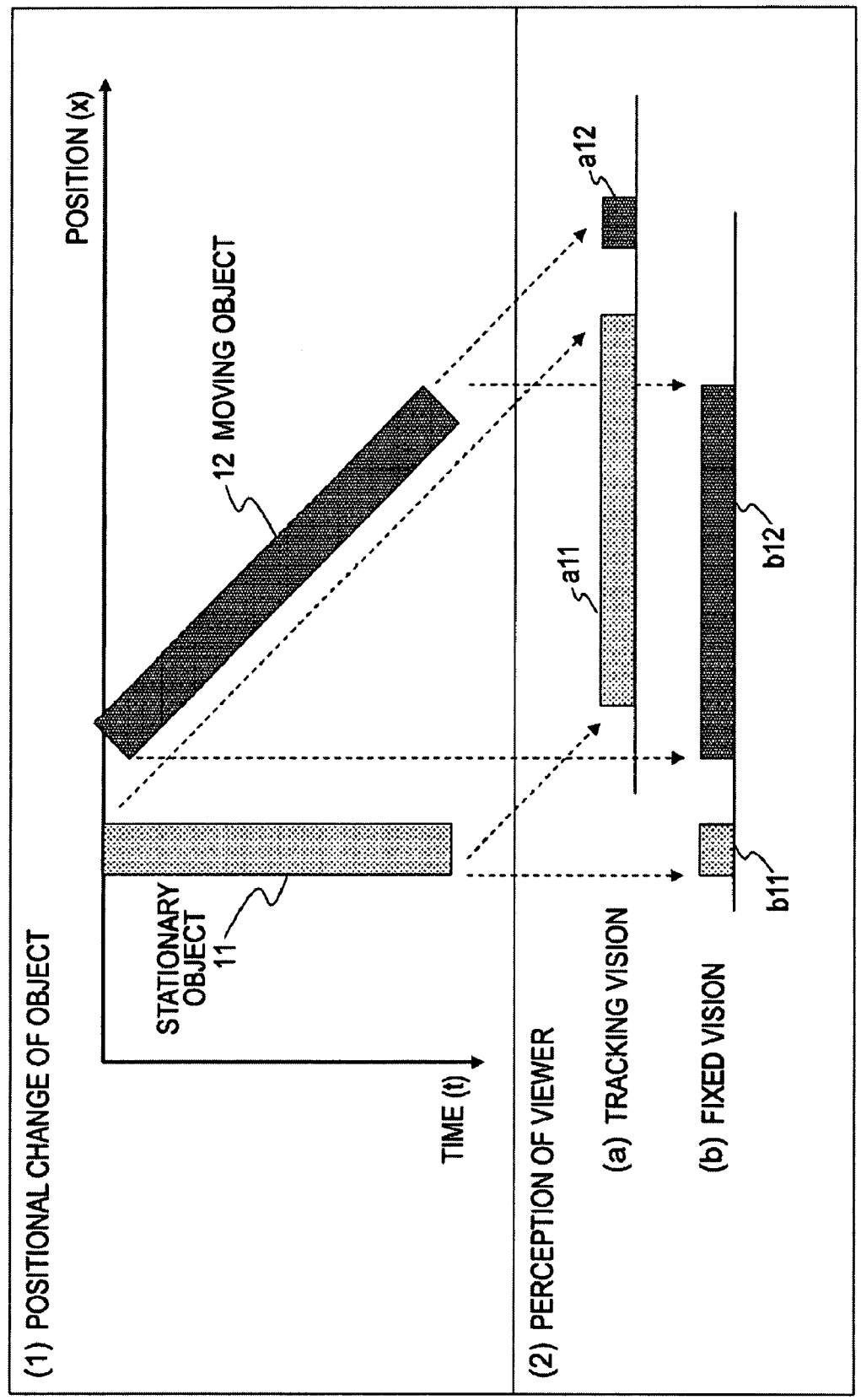
FIG. 1 illustrates a principle of occurrence of jerkiness and blur, in which a view in the real world of stationary and moving objects is illustrated.
Figure 2:
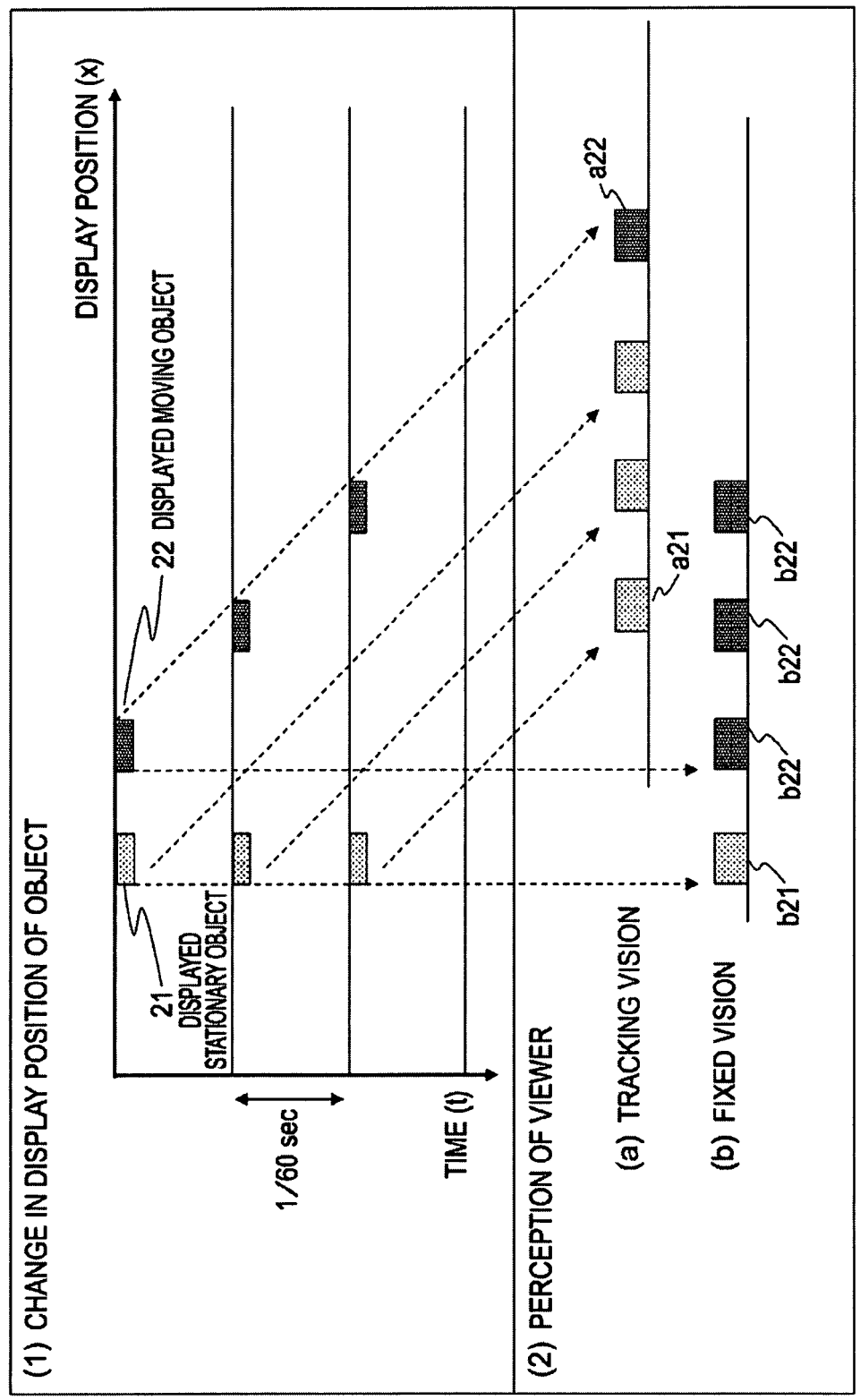
FIG. 2 illustrates a principle of occurrence of jerkiness.
Figure 3:
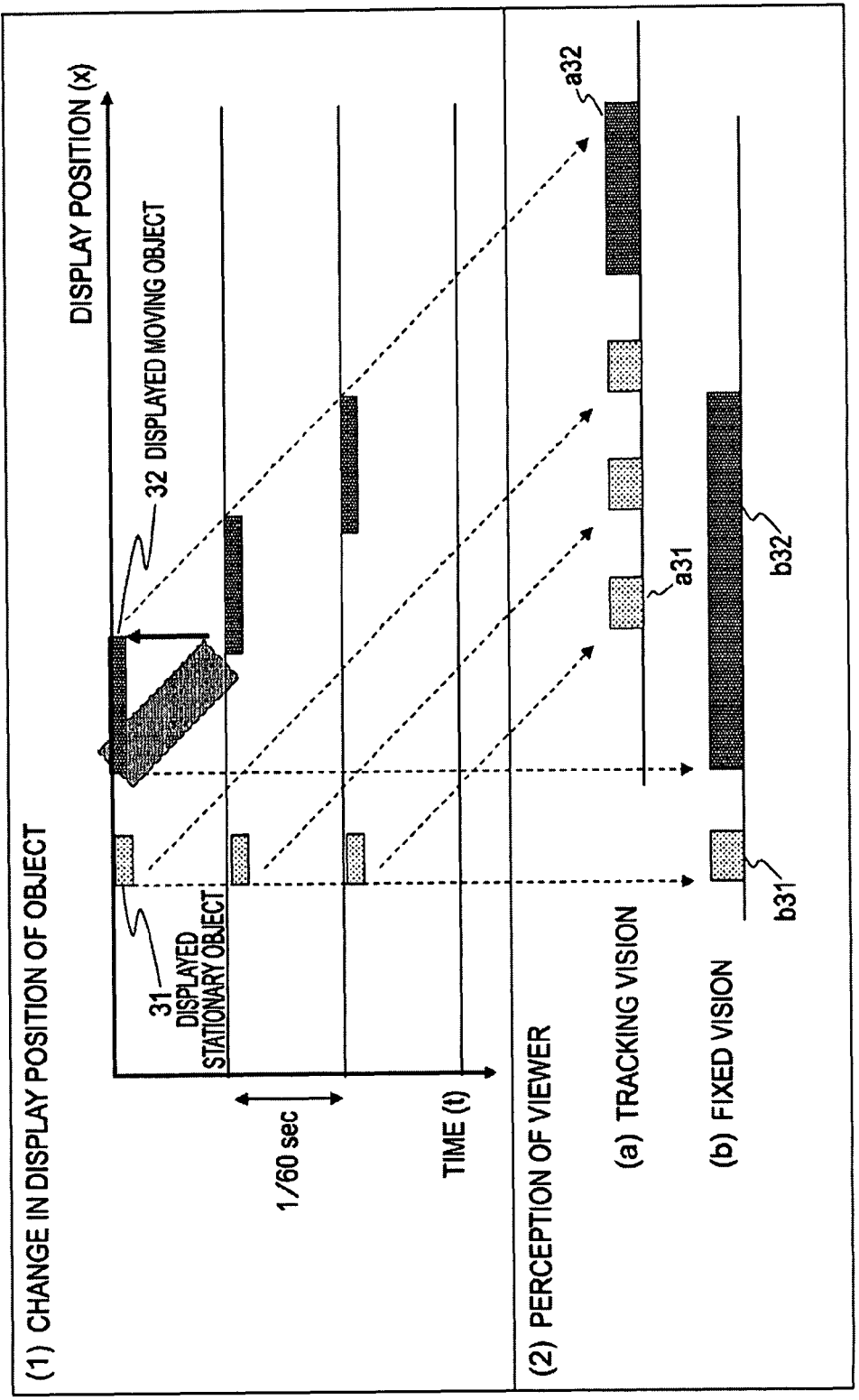
FIG. 3 illustrates a principle of occurrence of blur.

Hereinafter, configurations of an image processing apparatus, an image processing method, and a computer program according to the present invention are described with reference to the drawings.

In the image processing apparatus according to the present invention, each frame image of moving images input at a certain frame rate is divided into predetermined partial areas, interframe movement velocities and spatial feature quantities are calculated in units of partial areas, and an optimal filtering process is performed for each area based on the calculated movement velocities and spatial feature quantities of the respective partial areas. Accordingly, images in which jerkiness and blur are reduced in accordance with each area are generated, high-quality image signals in which degradation of image quality due to jerkiness and blur is suppressed are generated, and the image signals are output.

For example, in the image processing apparatus according to the present invention, a table associating interframe movement velocities and spatial feature quantities with parameters of a filtering process is held, and an optimal filtering process corresponding to each partial area is performed based on this table. Specifically, the optimal filtering process corresponding to each partial area is a process of determining an optimal imaging shutter speed to reduce occurrence of jerkiness and blur and generating an image corresponding to the imaging shutter speed in each partial area.

That is, the process of determining parameters of the optimal filtering process corresponding to each partial area includes a process of determining an optimal shutter speed to reduce occurrence of jerkiness and blur in each area. In the image processing apparatus according to the present invention, optimal shutter speeds to reduce occurrence of jerkiness and blur are determined for the respective partial areas, and pseudo images according to the determined shutter speeds are individually generated for the respective partial areas and are output.

Hereinafter, details of the image processing apparatus according to the present invention are described. The description is given in accordance with the following items.

1. Outline of a basic process in the image processing apparatus according to the present invention
2. Description about input image signals and output image signals
3. Details of a process in the movement velocity calculating unit
4. Description about a process in the image generation processing unit
5. Details of the filtering process performed by the filtering processing unit
6. Method for selecting frames used in the filtering process
7. Correspondence between movement velocities and optimal imaging shutter speeds
8. Method for calculating an optimal imaging shutter speed
9. Specific example of calculation of an optimal imaging shutter speed and an output frame generating process
10. Apparatus having a function of adjusting a curve of movement velocities and optimal shutter speeds
11. Outline of a second embodiment <1. Outline of a Basic Process in the Image Processing Apparatus According to the Present Invention>

Figure 4:
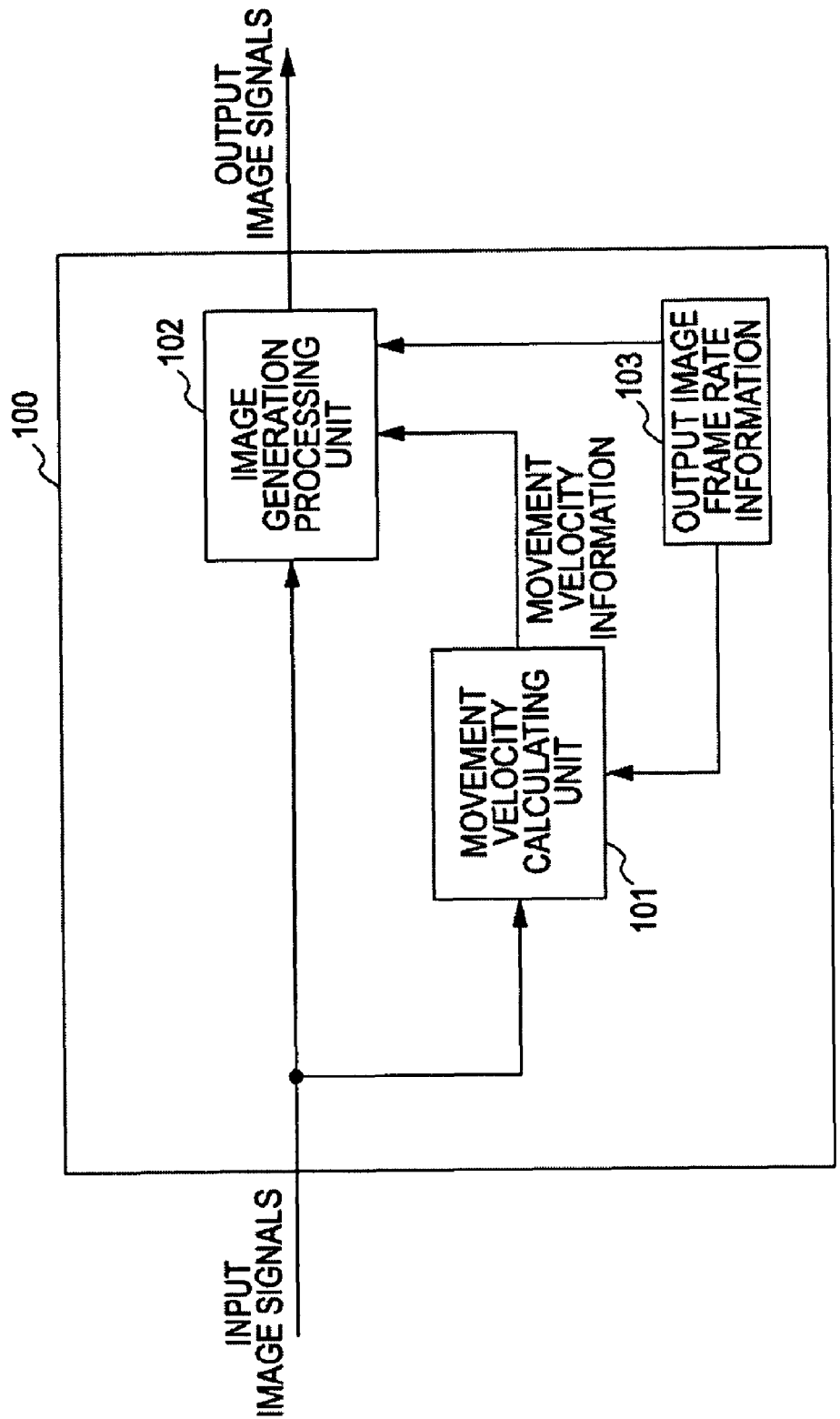
FIG. 4 is a block diagram showing a configuration of an image processing apparatus according to a first embodiment of the present invention.

First, an outline of a basic process in the image processing apparatus according to the present invention is described. FIG. 4 is a block diagram showing a configuration of an image processing apparatus 100 according to a first embodiment of the present invention. The image processing apparatus 100 receives image signals having a certain frame rate as images to be processed. Those input image signals are input to a movement velocity calculating unit 101 and an image generation processing unit 102.

Figure 5:
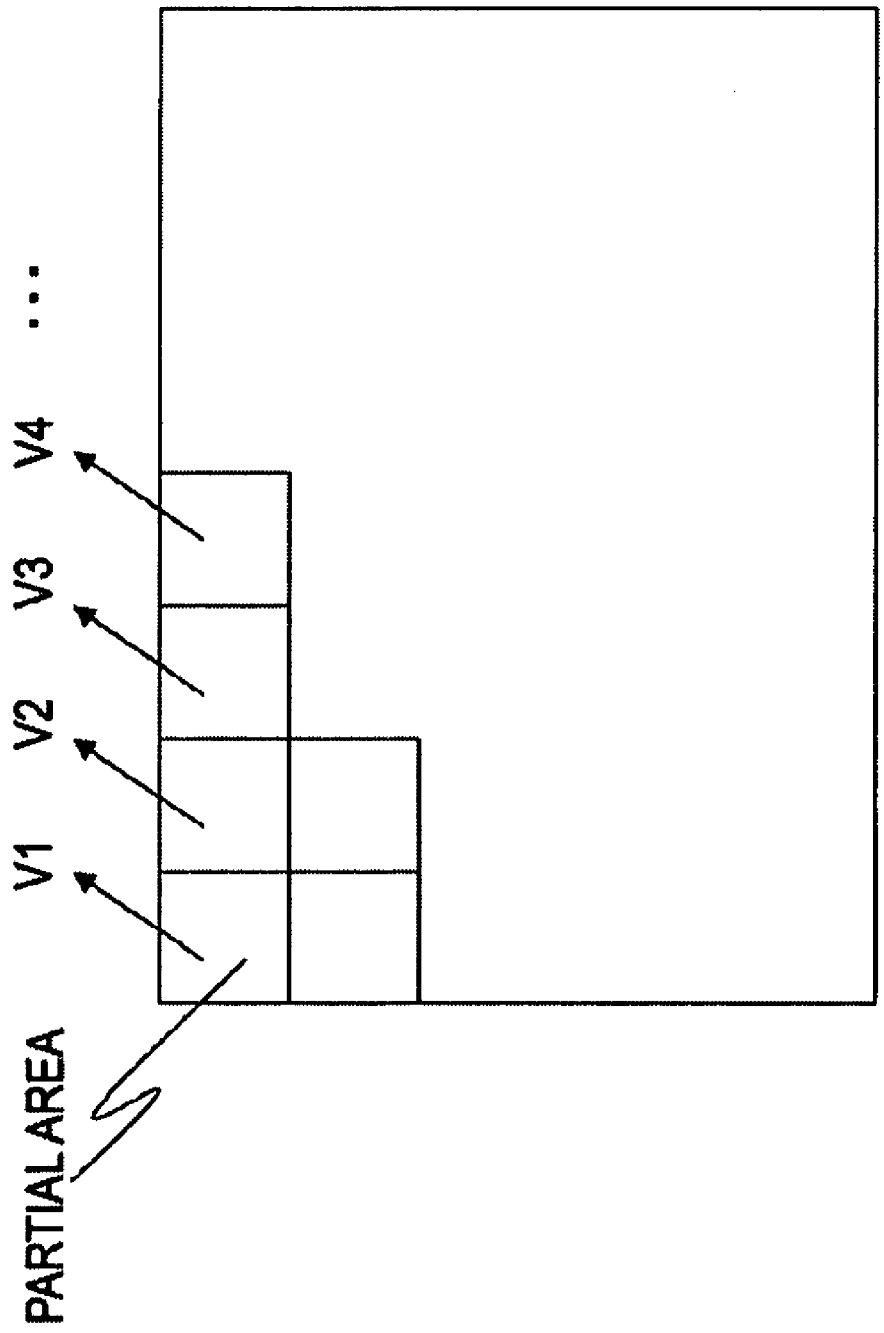
FIG. 5 illustrates a process of dividing each frame image of image signals into areas.

In the movement velocity calculating unit 101, each frame image of the input image signals is divided into partial areas, as shown in FIG. 5. Then, the movement velocity calculating unit 101 performs a block matching process on images included in the respective partial areas and calculates interframe movement velocities (V1, V2, V3, . . . ) of image data in the respective partial areas. Note that the interframe movement velocities (V1, V2, V3, . . . ) calculated here are interframe movement velocities corresponding to the frame rate of output image signals. The image processing apparatus holds output image frame rate information 103 in a storage unit. The movement velocity calculating unit 101 calculates the interframe movement velocities (V1, V2, V3, . . . ) of the respective partial areas based on the output image frame rate information 103.

The movement velocities in the respective partial areas calculated in the movement velocity calculating unit 101 are input to the image generation processing unit 102. The input image signals have already been input to the image generation processing unit 102. The image generation processing unit 102 performs conversion on the input images in units of partial areas in accordance with the movement velocities (V1, V2, V3, . . . ) in the respective partial areas calculated in the movement velocity calculating unit 101. That is, the image generation processing unit 102 performs a process of converting the input images to pseudo images corresponding to optimal shutter speeds to reduce occurrence of jerkiness and blur based on the movement velocities (Vn) calculated in units of partial areas.

The relationship between the movement velocities (Vn) calculated in units of partial areas and optimal imaging shutter speeds to reduce occurrence of jerkiness and blur can be calculated in accordance with the frame rate of output image signals. The image generation processing unit 102 holds this correspondence as a preset table and obtains optimal imaging shutter speeds for the respective areas from the held table by applying the output image frame rate information 103. Alternatively, the image generation processing unit 102 calculates optimal imaging shutter speeds to reduce occurrence of jerkiness and blur based on the movement velocities (Vn) calculated in unit of partial areas by using a predetermined expression.

Furthermore, the image generation processing unit 102 generates pseudo images corresponding to the calculated imaging shutter speeds for the respective partial areas, the generated images of the respective partial areas are combined into a frame image, and the frame image is output at a predetermined frame rate. By these processes, high-quality image data in which image degradation caused by jerkiness and blur is reduced is output.

In this way, the image generation processing unit 102 generates pseudo images that are captured at the optimal imaging shutter speeds determined based on the movement velocities in the respective partial areas calculated in the movement velocity calculating unit 101. This image generating process is realized by a filtering process or the like in a temporal direction. The images generated in the image generation processing unit 102 are output as output image signals having a certain frame rate.

<2. Description about Input Image Signals and Output Image Signals>

Hereinafter, the frame rates of input image signals and output image signals are described in detail. In the image processing apparatus 100 shown in FIG. 4, the frame rates of the input image signals and the output image signals generated by conversion are not limited, but various settings can be made. However, if the filtering process in a temporal direction is adopted as a process of generating pseudo images captured at optimal shutter speeds to reduce image degradation caused by both jerkiness and blur in respective areas in the image generation processing unit 102, it is preferable that the input image signals have as high frame rate as possible compared to a desired frame rate of the output image signals. This is because more smooth images can be easily generated by using input image signals of a higher frame rate in an image converting process performed in the image generation processing unit 102.

According to the description made about the example shown in FIG. 4, the frame rate value of the output image signals stored in the storage unit is referred to. However, the frame rate value of the output image signals may be input from the outside.

Figure 6:
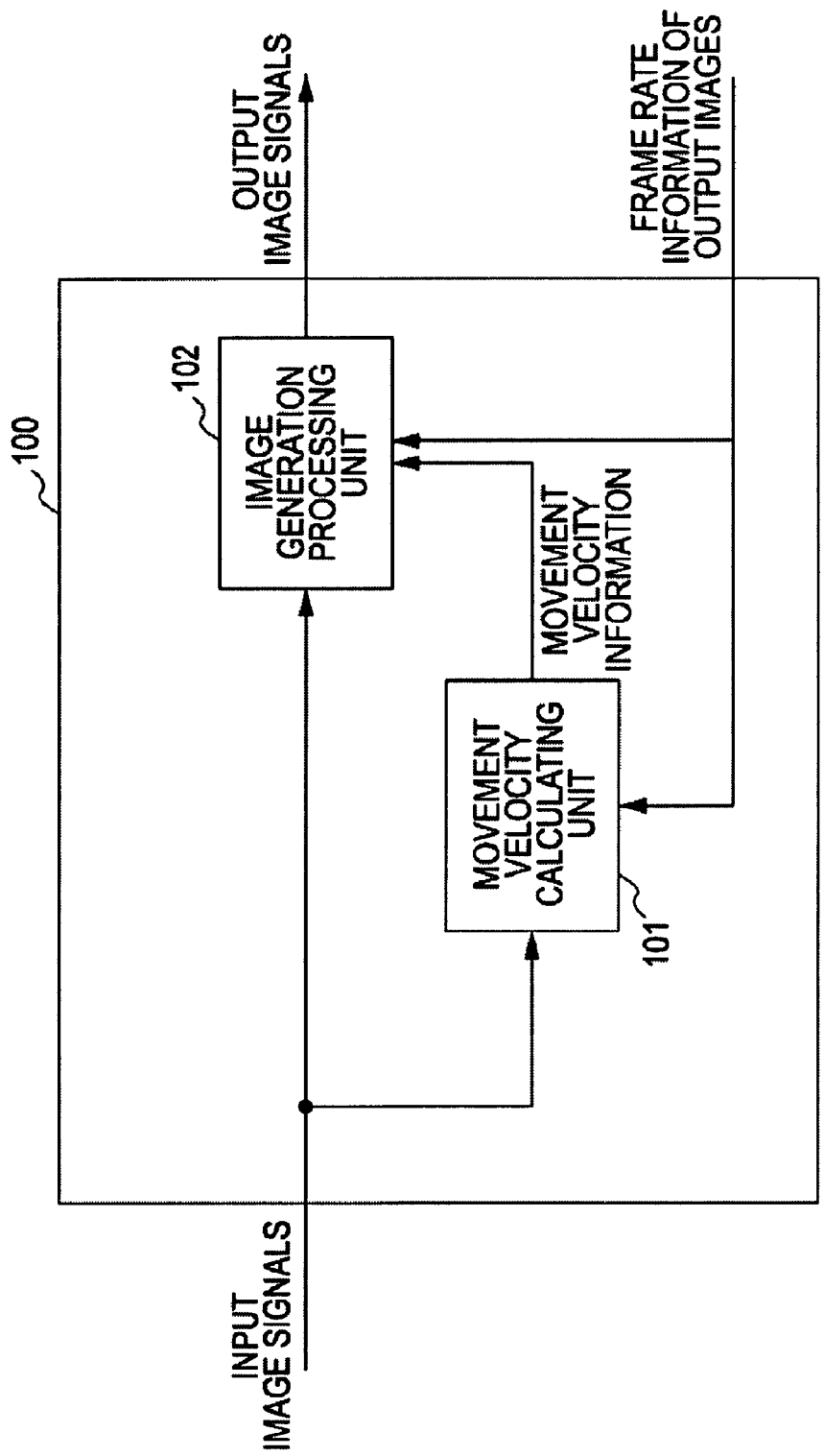
FIG. 6 shows an example of a configuration of the image processing apparatus having a configuration of receiving a frame rate value of output image signals from the outside.

FIG. 6 shows an example of a configuration of the image processing apparatus having a configuration of receiving a frame rate value of output image signals from the outside. The frame rate value of the output image signals received from the outside is input to both the movement velocity calculating unit 101 and the image generation processing unit 102 shown in FIG. 6. The image generation processing unit 102 performs an image converting process based on the input frame rate information. With this configuration, optimal image conversion corresponding to various frame rates can be performed.

Hereinafter, a specific example of the process performed by the image processing apparatus according to the present invention is described. For convenience of the description, the frame rates of input image signals and output image signals are set to the following values, for example:

the frame rate of input image signals is 240 (frames/second); and the frame rate of output image signals is 60 (frames/second).

However, these frame rates are examples, and the frame rates of the input and output images are not limited in the image processing apparatus according to the present invention.

<3. Details of a Process in the Movement Velocity Calculating Unit>

First, details of a process in the movement velocity calculating unit 101 are described. The movement velocity calculating unit 101 calculates interframe movement velocities in units of partial areas of images as described above with reference to FIG. 5 based on the frame rate of the output image signals, and outputs the interframe movement velocities to the image generation processing unit. The movement velocity indicates how much a subject moves in one frame. For example, the unit is pixels/frame, and the frame rate of the output image signals is used as a reference.

Figure 7:
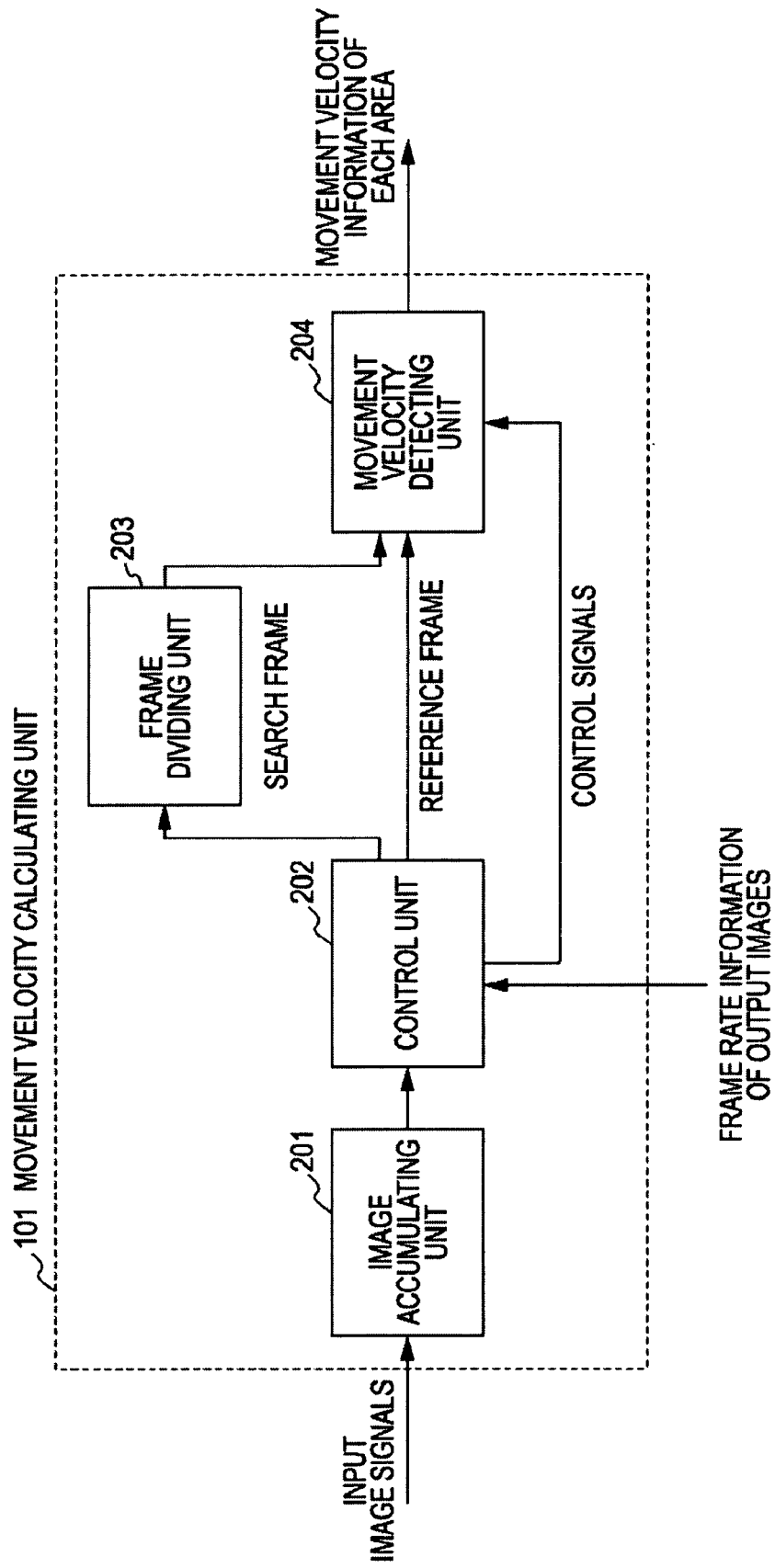
FIG. 7 shows a specific configuration of a movement velocity calculating unit.

FIG. 7 shows a specific configuration of the movement velocity calculating unit 101. As shown in FIG. 7, the movement velocity calculating unit 101 includes an image accumulating unit 201 to store a plurality of frames of input image signals; a control unit 202 to select frames used for a block matching process and perform read control from the image accumulating unit 201; a frame dividing unit 203 to divide a frame from which a motion is detected into areas; and a movement velocity detecting unit 204 to perform a block matching process and calculate movement velocities of respective areas.

Input image signals input to the movement velocity calculating unit 101 are input to and stored in the image accumulating unit 201. The image accumulating unit 201 is a storage unit capable of storing a plurality of frames. At an actual block matching process performed in the movement velocity detecting unit 204, data of at least two frames: a search frame from which motion vectors are detected; and its reference frame, is required. The image accumulating unit 201 stores the plurality of frames.

The control unit 202 selects a search frame and a reference frame and performs read control from the image accumulating unit 201. The selection of a search frame and a reference frame is performed in the control unit 202 based on frame rate information of output images input to the control unit 202. This selecting method is described in detail below.

The search frame from which motion vectors are detected and which is read by the control unit 202 is output to the frame dividing unit 203. Also, the reference frame read by the control unit 202 is directly output to the movement velocity detecting unit 204. The search frame output to the frame dividing unit 203 is divided into blocks of an appropriate size, each block being the unit of an area where a movement velocity is calculated. The search frame that has been divided into areas where movement velocities are to be calculated is input to the movement velocity detecting unit 204.

Figure 8:
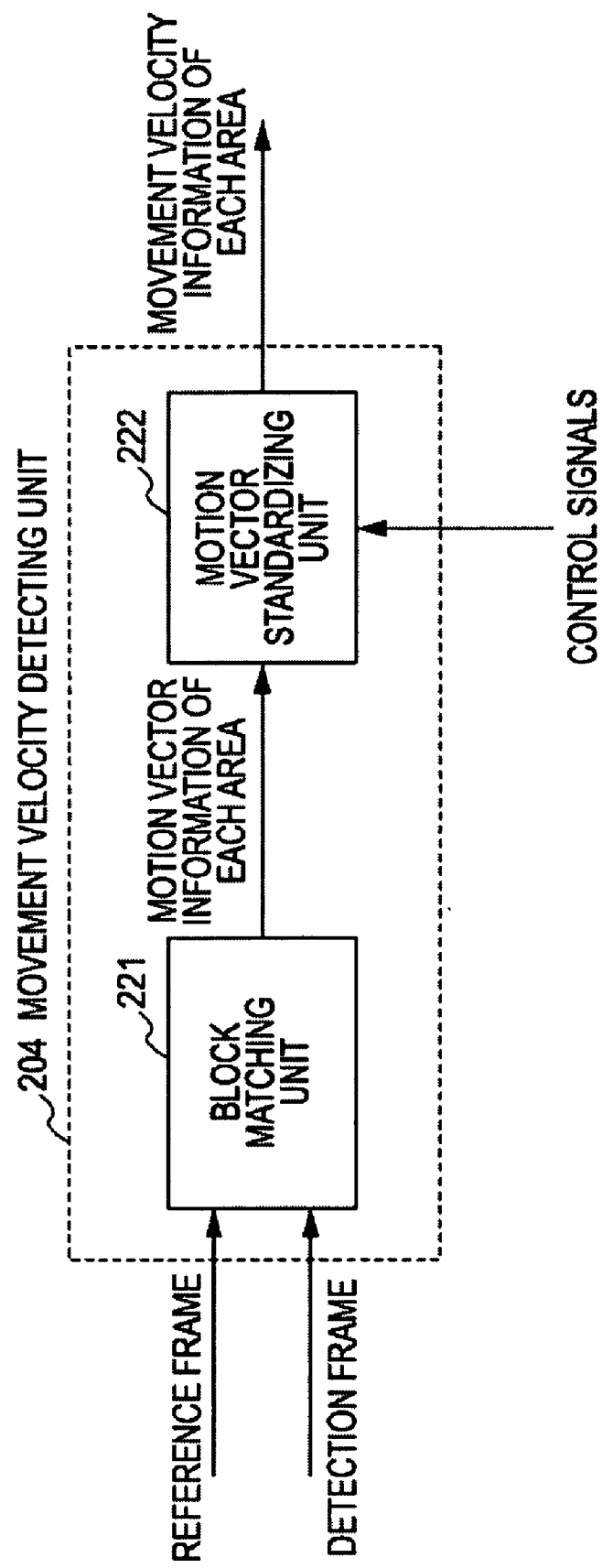
FIG. 8 shows an example of a specific configuration of a movement velocity detecting unit.

FIG. 8 shows an example of a specific configuration of the movement velocity detecting unit 204. The search frame image data input to the movement velocity detecting unit 204 is input to a block matching unit 221. The block matching unit 221 performs a block matching process in units of partial areas with reference to the reference frame input to the block matching unit 221. The block matching is a process of detecting corresponding pixel positions between frames in units of minute image areas.

The movement velocity detecting unit 204 performs the block matching process in units of partial areas so as to calculate motion vector quantities of the respective partial areas as interframe movement information of a subject. A matching evaluation function used in the block matching process can be variously set, and the method thereof is not limited.

The motion vector quantities of the respective partial areas calculated in the block matching process in the block matching unit 221 are input to a motion vector standardizing unit 222. Hereinafter, a process performed in the motion vector standardizing unit 222 is described.

The motion vector quantities of the respective areas in the search frame calculated by the block matching process in the block matching unit 221 indicate how much the subject has moved relative to the reference frame. On the other hand, the movement velocity (pixels/frame) to be obtained is a movement amount in one frame with reference to the frame rate of output images. Therefore, each of the motion vector quantities obtained through the block matching process needs to be standardized to a movement velocity (the unit is pixels/frame) indicating a movement amount in one frame with reference to the frame rate of output image signals.

The motion vector standardizing unit 222 receives control signals based on the frame rate information of the output image signals from the control unit 202, and performs a process of standardizing each of the motion vector quantities obtained through the block matching process to a movement velocity (the unit is pixels/frame) indicating a movement amount in one frame with reference to the frame rate of the output image signals, on the basis of the control signals.

By this standardization of motion vectors, movement velocities (pixels/frame) based on the frame rate of the output image signals are calculated. The method of standardization is described in detail below.

The movement velocities corresponding to the output frames in the respective areas calculated in the motion vector standardizing unit 222 are output as an output of the movement velocity calculating unit 101, from the movement velocity detecting unit 204 to the image generation processing unit 102.

In this way, the movement velocity calculating unit 101 performs a process of calculating movement velocities (pixels/frame) in units of partial areas based on the frame rate of output image signals. This process requires to select a search frame and a reference frame from among input images and to detect motion vectors based on these two frames. A method for selecting the search frame and the reference frame applied to detection of motion vectors is described in detail below.

(Frames Applied to Calculate Movement Velocities)

Figure 9:
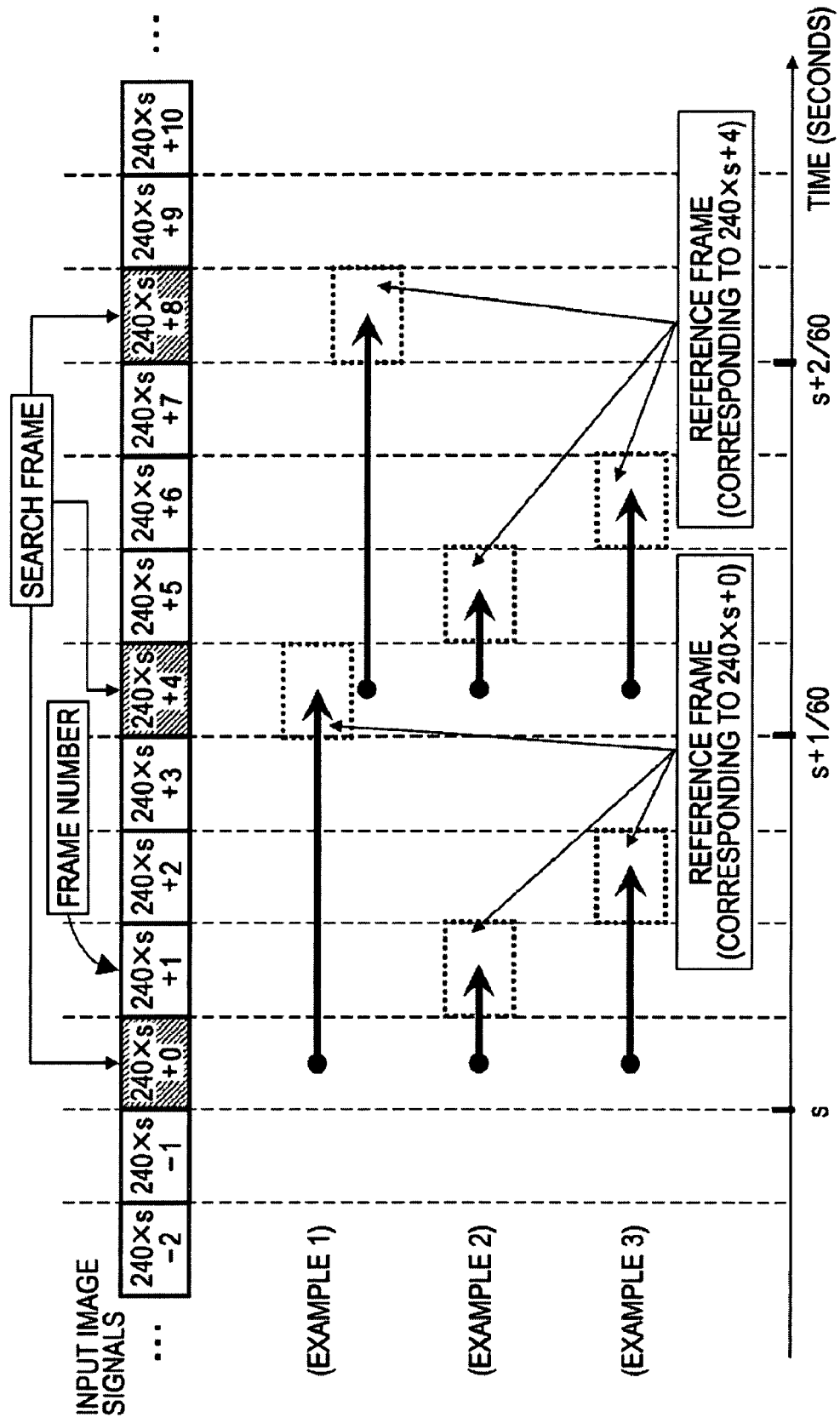
FIG. 9 illustrates a process of selecting search frames and reference frames to be applied to detection of motion vectors, the process being performed in the movement velocity calculating unit.

FIG. 9 illustrates a process of selecting a search frame and a reference frame applied to detection of motion vectors in the movement velocity calculating unit 101.

In this processing example, the following setting is made, as described above:

the frame rate of input image signals is 240 (frames/second); and the frame rate of output image signals is 60 (frames/second).

The search frame and the reference frame applied to detection of motion vectors in the movement velocity calculating unit 101 are frames constituting input images. The search frame and the reference frame applied to detection of motion vectors are selected from among frames constituting the input image signals having a frame rate of 240 (frames/second).

In FIG. 9, frame numbers are assigned to the respective frames of the input image signals. These numbers are assigned based on the assumption that a zeroth frame of the input image signals is captured at time 0 (seconds). Since the frame rate of the input image signals is 240 (frames/second), the frame at time s (seconds) is called a 240×s-th frame.

A method for selecting search frames and reference frames performed by the control unit 202 is described with reference to FIG. 9.

First, selection of search frames is described.

The search frames are extracted based on the frame rate of output images.

Here, the frame rate of the output image signals is 60 (frames/second), and thus frames captured at intervals of $\frac{1}{60}$ seconds are extracted as frames to be searched from the input image signals [240 (frames/second)].

In FIG. 9, a 240×s+zeroth frame, a 240×s+fourth frame, and a 240×s+eighth frame are shown as the selected search frames. Eventually, the number of search frames is the same as the number of frames of output images. In other words, a search frame is selected to generate a frame in the output images.

Next, selection of reference frames is described.

A reference frame is selected for each search frame.

More specifically, various selecting methods can be applied as in (example 1), (example 2), and (example 3) shown in FIG. 9.

An example where the 240×s+zeroth frame is a search frame and a reference frame for the 240×s+zeroth frame is selected is described. As described above, movement velocities (pixels/frame) to be obtained are based on a frame rate 60 (frames/second) of the output images. Thus, if the interval between the search frame and the reference frame is ⅟₆₀ seconds, the movement vectors calculated based on the search frame and the reference frame have a length corresponding to the movement velocities corresponding to the frame rate 60 (frames/second) of the output images. Thus, in this case, standardization of motion vectors obtained through the block matching process is unnecessary.

In a process of selecting reference frames in (example 1) shown in FIG. 9, the interval between the search frame and the reference frame is ⅟₆₀ seconds.

The frame captured ⅟₆₀ seconds after the 240×s+zeroth frame as a search frame has been captured is the 240×s+fourth frame. This 240×s+fourth frame is selected as the reference frame corresponding to the 240×s+zeroth frame as a search frame.

The frame captured ⅟₆₀ seconds after the 240×s+fourth frame as a next search frame has been captured is the 240×s+eighth frame. This 240×s+eighth frame is selected as the reference frame corresponding to the 240×s+fourth frame as a search frame.

As in this (example 1), when the interval between the search frame and the reference frame is set to ⅟₆₀ seconds, movement vectors calculated based on the search frame and the reference frame have a length corresponding to the movement velocities corresponding to the frame rate 60 (frames/second) of the output images. Therefore, in this case, standardization of motion vectors obtained through the block matching process is unnecessary.

On the other hand, selection of references frame as in (example 2) or (example 3) shown in FIG. 9 is acceptable. In (example 2), the reference frame corresponding to each search frame is set to the next frame of the search frame, that is, the frame after ⅟₂₄₀ seconds. In (example 3), the reference frame corresponding to each search frame is set to the second frame from the search frame, that is, the frame after ²⁄₂₄₀ seconds. In this way, a frame nearer to the search frame can be set as a reference frame.

When a reference frame nearer to the search frame is selected, an interframe movement amount of a subject is small, and a search range can be reduced in the block matching process. Accordingly, the speed and accuracy of the block matching process can be increased.

When the 240×s+zeroth frame is set as a search frame, the 240×s+first frame is selected as a reference frame in (example 2) shown in FIG. 9, while the 240×s+second frame is selected as a reference frame in (example 3).

In (example 2) and (example 3), the motion vectors obtained through the block matching process in the block matching processing unit 221 of the movement velocity detecting unit 204 are different from the movement velocities corresponding to the frame rate of the output image signals. Thus, standardization to convert the obtained motion vectors to the movement velocities corresponding to the frame rate of the output image signals needs to be performed. Hereinafter, a method for standardizing motion vectors is described.

(Standardization of Motion Vectors)

In (example 2) shown in FIG. 9, the 240×s+zeroth frame serving as a search frame and the 240×s+first frame serving as a reference frame are frames captured with a difference of ⅟₂₄₀ seconds. On the other hand, the frame rate of the output images is 60 (frames/second). The motion vector standardizing unit 222 of the movement velocity detecting unit 204 performs standardization to convert the movement vectors calculated between frames captured with a difference of ⅟₂₄₀ seconds to movement velocities corresponding to the frame rate of the output images [60 (frames/second)]. This standardization corresponds to calculating movement amounts in ⅟₆₀ seconds based on the movement vectors.

In (example 2) shown in FIG. 9, the motion vectors obtained through the block matching process are movement vectors calculated based on the frames captured with a difference of ⅟₂₄₀ seconds. The movement amounts to be calculated are movement amounts in ⅟₆₀ seconds. Thus, movement velocities standardized to those corresponding to the frame rate of the output image signals [60 (frames/second)] can be calculated by multiplying the motion vectors obtained through the block matching process by (⅟₆₀)/(⅟₂₄₀)=4.

In (example 3) shown in FIG. 9, the motion vectors obtained through the block matching process are movement vectors calculated based on the frames captured with a difference of ²⁄₂₄₀ seconds. The movement amounts to be calculated are movement amounts in ⅟₆₀ seconds. Thus, movement velocities standardized to those corresponding to the frame rate of the output image signals [60 (frames/second)] can be calculated by multiplying the motion vectors obtained through the block matching process by (⅟₆₀)/(²⁄₂₄₀)=2.

Such standardization of motion vectors is performed in the motion vector standardizing unit 222 in the movement velocity detecting unit 204. In this embodiment, when the control unit 202 selects search frames and reference frames, a coefficient required for standardization by which the length of a motion vector is multiplied is calculated at real precision, and the calculated value is output as a control signal to the motion vector standardizing unit 222.

In the description made above, selection of search frames, selection of reference frames, and a method for standardizing obtained motion vectors to calculate movement velocities have been described. As described above, in this processing example, a search frame of a movement velocity is set to generate one frame of output images. As a result, search frames of which number is the same as the number of frames of output images are selected. In each of the search frames, movement velocities in the respective partial areas set in the frame are calculated as the values corresponding to the frame rate of output images, and are output from the movement velocity calculating unit 101 to the image generation processing unit 102.

<4. Description about a Process in the Image Generation Processing Unit>

Next, details of a process performed by the image generation processing unit 102 are described. The image generation processing unit 102 performs an adaptable image converting process in units of partial areas of input images in accordance with the movement velocities in the respective areas of images received from the movement velocity calculating unit 101, generates pseudo images in which occurrence of jerkiness and blur is suppressed to a maximum extent, that is, pseudo images captured at optimal shutter speeds, in units of partial areas, combines the pseudo images that correspond to the optimal shutter speeds and that are generated in units of partial areas so as to generate one frame image, and outputs the frame image.

Figure 10:
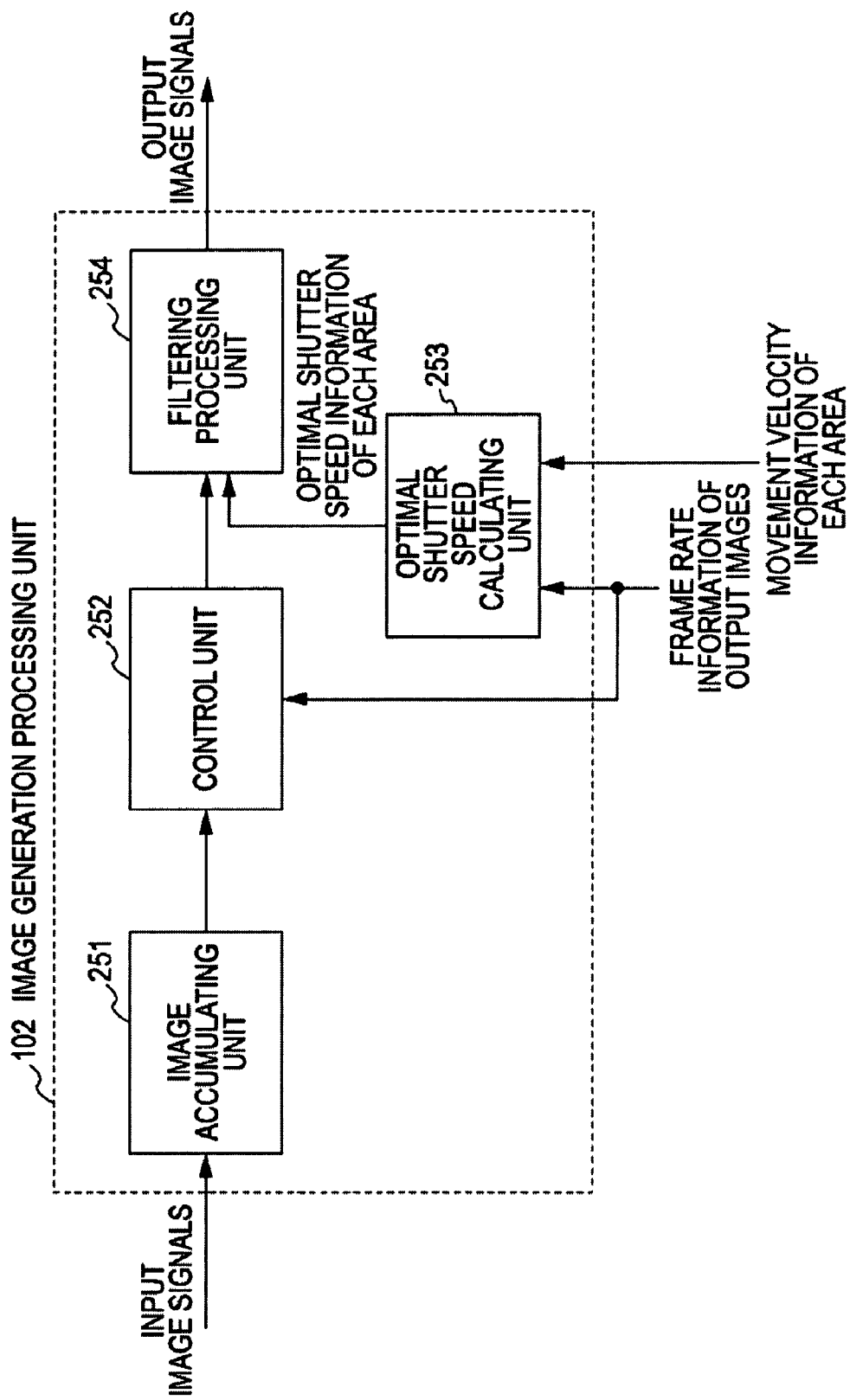
FIG. 10 is a block diagram showing an example of a specific configuration of an image generation processing unit.

FIG. 10 is a block diagram showing an example of a specific configuration of the image generation processing unit 102. As shown in FIG. 10, the image generation processing unit 102 includes an image accumulating unit 251 to store a plurality of frames of input image signals; a control unit 252 to select frames used in a filtering process and perform read control from the image accumulating unit 251; an optimal shutter speed calculating unit 253 to calculate optimal imaging shutter speeds for the respective areas based on movement velocities; and a filtering processing unit 254 to perform an adaptable filtering process in units of areas of input images.

The image generation processing unit 102 generates pseudo images of optimal shutter speeds in units of partial areas of images to be processed. That is, the image generation processing unit 102 generates images in which occurrence of jerkiness and blur is suppressed to a maximum extent in units of partial areas. As an example of the image generating process, a processing example using a filtering process in a temporal direction is described below.

A flow of a process of generating a frame of output image signals is described with reference to FIG. 10. The input image signals input to the image generation processing unit 102 are input to the image accumulating unit 251 and are stored therein. The image accumulating unit 251 is a storage unit capable of storing a plurality of frames. The frames used for the filtering process are sequentially read from the input image signals accumulated in the image accumulating unit 251. This read control is performed by the control unit 252.

Details of selection of read frames used to generate a frame of output images are described below. The respective frames in the input images read under control by the control unit 252 are input to the filtering processing unit 254.

On the other hand, the movement velocity information corresponding to the respective partial areas of input images output from the movement velocity calculating unit 101 is input to the optimal shutter speed calculating unit 253. This movement velocity information is calculated for each area in the search frames selected from the input image signals by the control unit 202 in the movement velocity calculating unit 101 (see FIG. 7). As described above with reference to FIG. 9, the respective search frames correspond to the respective frames of output images to be generated in a one-to-one relationship.

The optimal shutter speed calculating unit 253 calculates optimal imaging shutter speeds for respective areas in a target frame of output images based on the input movement velocity information corresponding to the respective partial areas. Details of the relationship between movement velocities and optimal imaging shutter speeds are described below, but each optimal imaging shutter speed is calculated based on a setting condition where degradation due to both jerkiness and blur can be reduced to a maximum extent when the output images are displayed at a specified frame rate. This setting condition is held in advance by the optimal shutter speed calculating unit 253.

The optimal shutter speed calculating unit 253 receives movement velocity information corresponding to the respective partial areas and calculates optimal imaging shutter speeds to reduce degradation due to both jerkiness and blur to a maximum extent. The optimal imaging shutter speeds calculated here are optimal imaging shutter speeds of respective partial areas set in each frame of output images. The optimal shutter speed calculating unit 253 outputs the calculated optimal imaging shutter speeds corresponding to the respective partial areas in each frame of output images to the filtering processing unit 254.

Furthermore, input image frames that are read from the image accumulating unit 251 based on control by the control unit 252 and that are used to generate corresponding frames of output images are input to the filtering processing unit 254. The filtering processing unit 254 performs image processing on these input images. That is, the filtering processing unit 254 performs a filtering process of generating pseudo images of optimal shutter speeds for respective partial areas of each input image frame based on the optimal imaging shutter speeds corresponding to the respective partial areas in each output image frame input from the optimal shutter speed calculating unit 253. The images generated in the filtering processing unit 254 are output as one frame of output image signals.

The image generation processing unit 102 repeats the above-described process, the number of repetitions being the same as the number of frames of output images, so as to output the output image signals having a specified frame rate.

<5. Details of the Filtering Process Performed by the Filtering Processing Unit>

The filtering processing unit 254 performs a filtering process of generating pseudo images captured at optimal shutter speeds for respective partial areas of each input image frame, on the basis of the optimal imaging shutter speeds corresponding to the respective partial areas in each output image frame input from the optimal shutter speed calculating unit 253. One of methods for realizing this filtering process most easily is a process of averaging the partial areas of each input image frame in a temporal direction.

By performing averaging while changing the number of frames to be used in the averaging for each area in accordance with optimal imaging shutter speeds, output pseudo images in which the shutter speed at imaging varies in each area can be generated.

When an averaging process in a temporal direction is performed, it is effective to use a method of generating a more smooth motion blur by generating an intermediate frame to interpolate between existing frames. This interpolating process is especially effective when the frame rate of input image signals is not sufficiently high compared to the frame rate of output image signals. An example of a configuration of the image generation processing unit 102 to perform this interpolating process is shown in FIG. 11.

Figure 11:
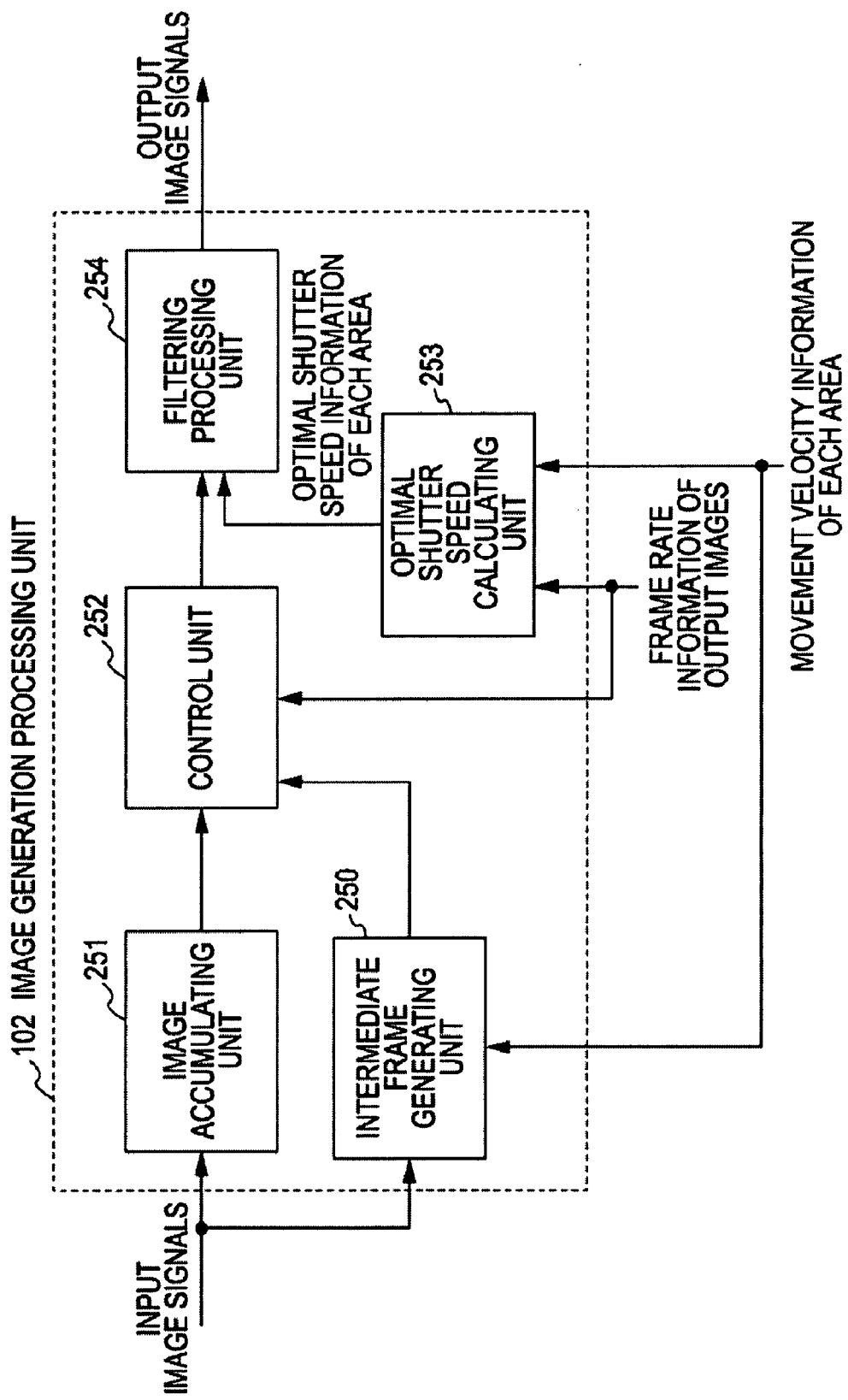
FIG. 11 shows an example of a configuration of the image generation processing unit added with an intermediate frame generating unit.

FIG. 11 shows an example of a configuration of the image generation processing unit 102 added with an intermediate frame generating unit. In FIG. 11, input image signals are input to both the image accumulating unit 251 and the intermediate frame generating unit 250. The intermediate frame generating unit 250 generates an intermediate frame based on existing frames. By using this intermediate frame, smooth images can be generated in the filtering process performed in the filtering processing unit 254 on a later stage.

Various existing methods can be applied to a method of generating an intermediate frame in the intermediate frame generating unit 250. For example, existing two frames may be blended while being weighted. Alternatively, as shown in FIG. 11, movement velocity information of each area may be input to the intermediate frame generating unit 250 and weighting and image blending may be performed based on the movement velocity information. Accordingly, an intermediate frame of higher accuracy can be generated.

Also, as the filtering process of generating captured pseudo images of optimal shutter speeds in the filtering processing unit 254, a bandwidth-limited filter process may be performed in a temporal direction other than the averaging process in a temporal direction, so as to change the limited bandwidth (or pass band) of signals. Furthermore, various methods can be applied, for example, band-limited filtering in a spatial direction as well as filtering in a temporal direction, and a method for generating motion blur by obtaining surrounding pixel information by using motion vectors (e.g., the method disclosed in "Image-Based Motion Blur for Stop Motion Animation", G. J. Brostow et al. SIGGRAPH 2001).

<6. Method for Selecting Frames Used in the Filtering Process>

As described above, the filtering processing unit 254 performs a filtering process of generating pseudo images captured at optimal shutter speeds in units of partial areas of each input image frame, on the basis of the optimal imaging shutter speeds corresponding to the respective partial areas in each output image frame input from the optimal shutter speed calculating unit 253. That is, the filtering processing unit 254 generates pseudo images captured at optimal shutter speeds in which occurrence of jerkiness and blur can be suppressed to a maximum extent in units of partial areas of each input image frame.

Figure 12:
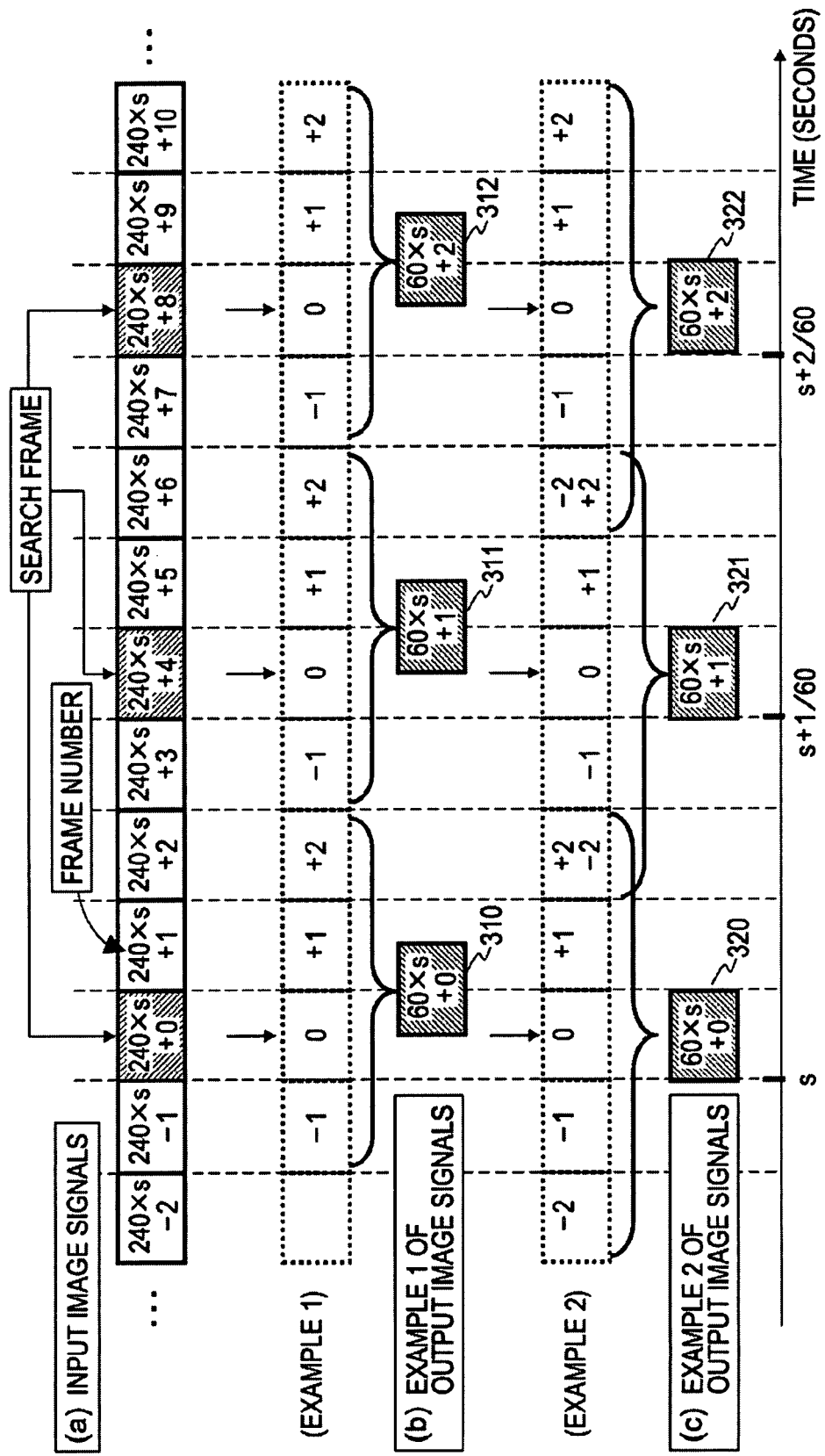
FIG. 12 illustrates the correspondence between input image frames used in a filtering process and image frames to be output.

A process of selecting read frames used to generate one frame of output images is described with reference to FIG. 12. FIG. 12 illustrates the correspondence between input image frames used in the filtering process and image frames to be output.

As described above, in the image processing apparatus according to the present invention, a combination of frame rates of input images and output images can be variously set. Here, an example in the following combination is described;

the frame rate of input image signals is 240 (frames/second); and the frame rate of output image signals is 60 (frames/second). Note that, in the processing example described below, no intermediate frame is generated.

Referring to FIG. 12, in (a) input image signals, frame numbers are assigned to respective frames as in FIG. 9 described above. These numbers are assigned based on the assumption that a zeroth frame of the input image signals is captured at time 0 (seconds). Since the frame rate of the input image signals is 240 (frames/second), the frame at time s (seconds) is called a 240×s-th frame.

Under control by the control unit 252 of the image generation processing unit 102 shown in FIG. 10, a process of selecting read frames used in the filtering process to generate a frame of output images is performed. FIG. 12 shows two examples (example 1) and (example 2) of this frame selecting process.

In the (a) input image signals shown in FIG. 12, the 240×s+zeroth frame, the 240×s+fourth frame, and the 240×s+eighth frame, which are described above with reference to FIG. 9, are shown as search frames with shading.

In this processing example, the frame rate of output image signals is 60 (frames/second). Thus, frames captured at intervals of 1/60 seconds are extracted as search frames from the input image signals [240 (frames/second)]. That is, the frames selected as frames to be searched in the movement velocity calculating unit 101 are the 240×s+zeroth frame, the 240×s+fourth frame, and the 240×s+eighth frame that are shaded.

In this embodiment, input image frames used in the filtering process to generate output images are the search frame corresponding to each output image frame and the frames before and after the search frame. The input image frames applied to the filtering process to generate one output frame are not always the search frame corresponding to each output image frame and the frames before and after the search frame. Alternatively, the search frame corresponding to each output image frame and only a frame before or after the search frame can be applied. In this way, various processing forms can be applied.

However, as described above with reference to FIG. 9, a search frame of movement velocities is associated with each frame of output images. When output image frames are to be generated by a filtering process, a filtering process on which movement velocity information is reflected can be performed by using the search frame corresponding to each of the output image frames and the frames before and after the search frame.

FIG. 12 shows two examples (example 1) and (example 2) of a process of selecting read frames used in a filtering process to generate a frame of output images under control by the control unit 252 of the image generation processing unit 102.

The search frame applied to detection of movement velocities in input images corresponding to a 60×s+zeroth output image frame is the 240×s+zeroth input image frame.

The search frame applied to detection of movement velocities in input images corresponding to a 60×s+first output image frame is the 240×s+fourth input image frame.

The search frame applied to detection of movement velocities in input images corresponding to a 60×s+second output image frame is the 240×s+eighth input image frame.

First, a process in (example 1) is described.

According to the setting in (example 1), the input image frames applied to a filtering process to generate a 60×s+zeroth output image frame 310 are the corresponding 240×s+zeroth frame as a search frame of movement velocities, the frame before the 240×s+zeroth frame, and the two frames after the 240×s+zeroth frame, as shown in the figure. That is, four frames: the 240×s−first frame; the 240×s+zeroth frame; the 240×s+first frame; and the 240×s+second frame, are selected as the frames used in the filtering process.

According to the figure, the search frame applied to detection of movement velocities corresponding to an output image frame is represented by [0], the n-th frame before the search frame is represented by [−n], and the n-th frame after the search frame is represented by [+n]. In (example 1), the input image frames applied to the filtering process to generate an output image frame are the frames from the first frame before the search frame (−1) of movement velocities corresponding to the output image frame to the second frame after the search frame (+2), that is, the four frames of −1, 0, +1, and +2. By applying these four frames, a filtering process of generating pseudo images captured at optimal shutter speeds is performed in units of partial areas. For example, a process of averaging the partial areas of each input image frame in a temporal direction is performed.

In (example 1), the four frames: the corresponding search frame; the frame before the search frame; and the two frames after the search frame (−1 to +2), are selected as the frames used in the filtering process. This is the same for the case of generating a 60×s+first frame 311 or a 60×s+second frame 312.

According to the setting in (example 2), the input image frames applied to a filtering process to generate a 60×s+zeroth output image frame 320 are the corresponding 240×s+zeroth frame as a search frame of movement velocities, the two frames before the 240×s+zeroth frame, and the two frames after the 240×s+zeroth frame, as shown in the figure. That is, five frames: the 240×s−second frame; the 240×s−first frame; the 240×s+zeroth frame; the 240×s+first frame; and the 240×s+second frame, are selected as the frames used in the filtering process.

In (example 2), the five frames: the corresponding search frame; the two frames before the search frame; and the two frames after the search frame (−2 to +2), are selected as the frames used in the filtering process. This is the same for the case of generating a 60×s+first frame 321 or a 60×s+second frame 322. In example 2, by applying these five frames, a filtering process of generating pseudo images captured at optimal shutter speeds is performed in units of partial areas. For example, a process of averaging the partial areas of each input image frame in a temporal direction is performed.

In (example 2), the 240×s+second frame is used in the filtering process to generate the 60×s+zeroth and 60×s+first output image frames 320 and 321, and the 240×s+sixth frame is used in the filtering process to generate the 60×s+first and 60×s+second output image frames 321 and 322. Such a duplicate frame selection does not cause a problem.

<7. Correspondence Between Movement Velocities and Optimal Imaging Shutter Speeds>

As described above, the optimal shutter speed calculating unit 253 in the image generation processing unit 102 shown in FIG. 11 receives movement velocities in respective partial areas in each image output from the movement velocity calculating unit 101. On the basis of the movement velocity information of each partial area, the optimal shutter speed calculating unit 253 calculates optimal imaging shutter speeds, that is, imaging shutter speeds in which jerkiness and blur can be reduced to a maximum extent.

At that time, the optimal shutter speed calculating unit 253 calculates respective imaging shutter speeds based on the table associating movement velocities with optimal imaging shutter speeds or a preset expression. The optimal shutter speed calculating unit 253 holds the table associating movement velocities with optimal imaging shutter speeds or expression information.

Figure 13:
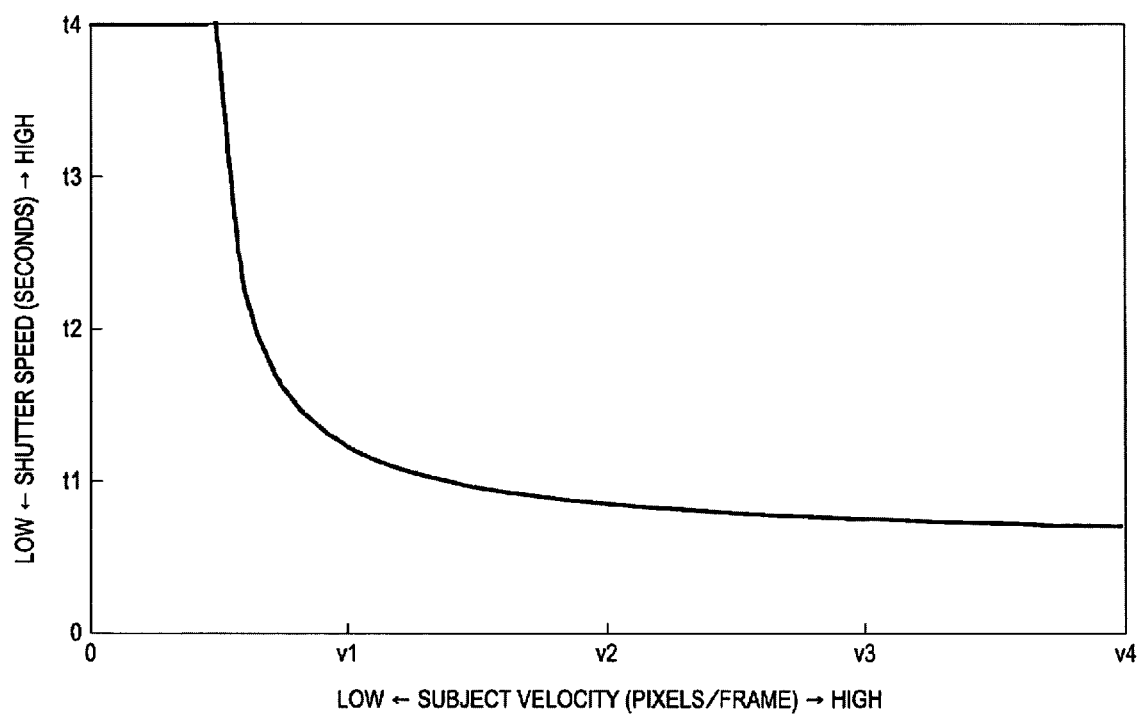
FIG. 13 shows an example of the correspondence between movement velocities and optimal imaging shutter speeds.

FIG. 13 shows an example of the correspondence between movement velocities and optimal imaging shutter speeds. In this graph, the horizontal axis indicates movement velocities and the vertical axis indicates shutter speeds. The curve in the graph indicates the correspondence between the movement velocities and the optimal imaging shutter speeds. The curve shown in FIG. 13 is a graph showing a result obtained through a subjective evaluation experiment.

An experiment is performed on a plurality of patterns about the brightness and movement velocity of a subject and an imaging shutter speed, so as to search for a condition where degradation due to both jerkiness and blur can be reduced to a maximum extent. Furthermore, the results about a plurality of examinees are averaged and the average is approximated by a function. Accordingly, the curve shown in FIG. 13 can be obtained.

Hereinafter, descriptions are made by using the curve shown in FIG. 13 obtained as a result of the experiment as an example in this embodiment. This curve is an example indicating the correspondence between movement velocities and optimal imaging shutter speeds, and the apparatus according to the present invention is not limited to application of this curve. The optimal shutter speed calculating unit 253 may have a configuration capable of calculating optimal imaging shutter speeds to reduce degradation due to both jerkiness and blur based on the movement velocity information of respective partial areas input thereto, and needs to hold a correspondence table or an expression for that purpose.

The apparatus to perform the process according to this embodiment can be configured so that the correspondence between velocities and optimal imaging shutter speeds can be changed in accordance with a response characteristic of a device to display output image signals or preference of a user. This is described in detail below.

<8. Method for Calculating an Optimal Imaging Shutter Speed>

Hereinafter, an example of a process of calculating an optimal imaging shutter speed by inputting movement velocity information of a partial area in a case where the optimal shutter speed calculating unit 253 holds the graph data shown in FIG. 13 as a correspondence table between movement velocities and optimal imaging shutter speeds is described. That is, an example of the most basic process of calculating an optimal imaging shutter speed for a partial area in an image when the movement velocity information in the partial area is input to the optimal shutter speed calculating unit 253 is described with reference to FIG. 14.

Figure 14:
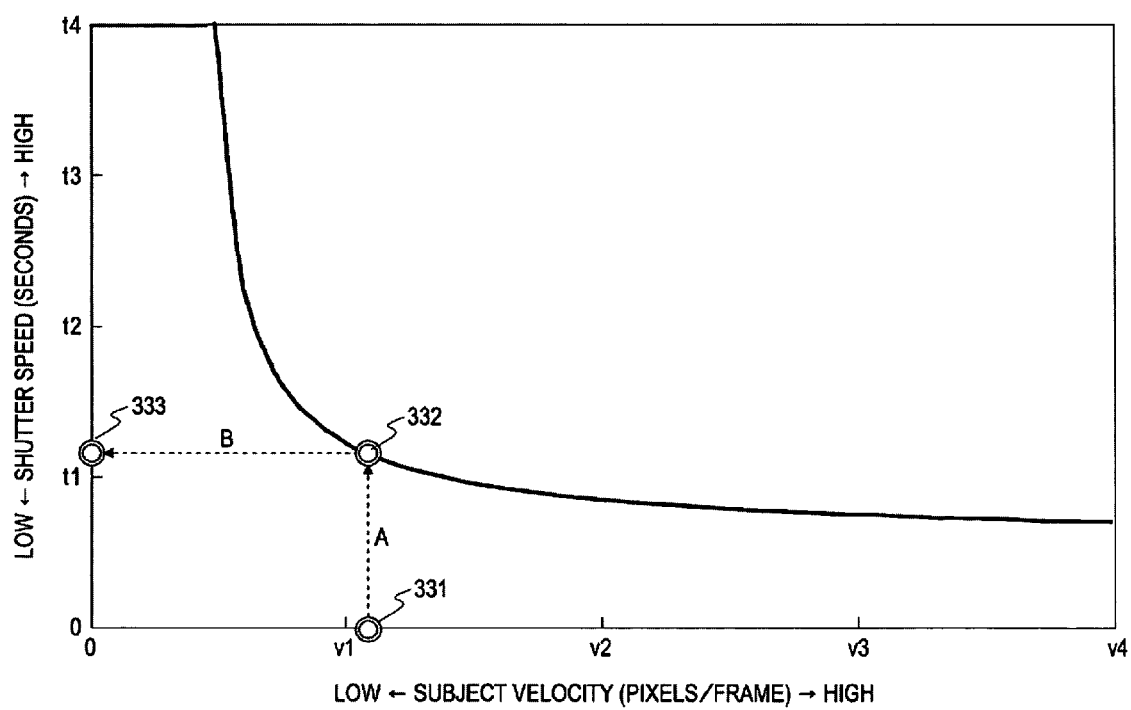
FIG. 14 illustrates an example of a basic process of calculating an optimal imaging shutter speed based on movement velocity information.

First, the value of the movement velocity in one of the partial areas of an output frame is searched for in the horizontal axis of the graph. For example, assume that a movement velocity point 331 on the horizontal axis shown in FIG. 14 is the value of the movement velocity in one of the partial areas of an output frame. Then, the point on the graph curve corresponding to the value on the horizontal axis is searched for. The point on the graph curve corresponding to the value on the horizontal axis (movement velocity point 331) is searched for by using an arrow A shown in the figure. Accordingly, a graph point 332 shown in the figure is found.

Then, the value on the vertical axis corresponding to the point 332 found on the graph curve is searched for. The value on the vertical axis corresponding to the point 332 on the graph curve (optimal imaging shutter speed point 333) is searched for by using an arrow B shown in the figure. With this process, the value of the optimal imaging shutter speed (optimal imaging shutter speed point 333) for the movement velocity in the specific partial area can be obtained. In this way, optimal shutter speeds corresponding to the movement velocities in the respective partial areas are obtained. The optimal imaging shutter speeds that have been determined are output from the optimal shutter speed calculating unit 253 of the image generation processing unit 102 shown in FIG. 11 and are input to the filtering processing unit 254.

Figure 15:
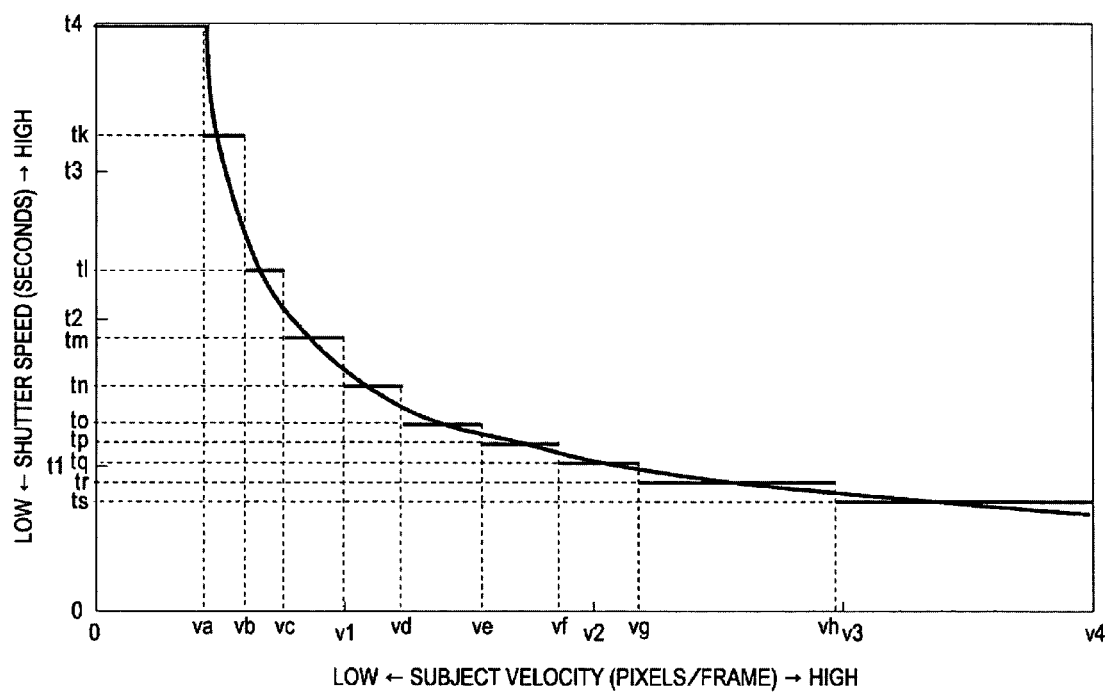
FIG. 15 roughly shows an example of the relationship between movement velocities and optimal imaging shutter speeds.

The above-described method for calculating an imaging shutter speed is an example of the most basic method, and can be simplified in accordance with necessity for a higher speed of a calculating process or a decrease in the amount of stored data. FIG. 15 roughly shows an example of the relationship between movement velocities and optimal imaging shutter speeds shown in FIG. 13. By expressing information of the relationship between movement velocities and optimal imaging shutter speeds in the form of roughened data as shown in FIG. 13, the information that should be held in advance by the optimal shutter speed calculating unit 253 becomes data in a table form of limited combinations, so that the amount of data is reduced.

That is, in this example, the information that should be held in advance by the optimal shutter speed calculating unit 253 is correspondence data of movement velocities and optimal shutter speeds shown in FIG. 16. As shown in FIG. 16, the optimal shutter speed is t4 when the movement velocity is 0 to Va;

the optimal shutter speed is tk when the movement velocity is Va to Vb;

the optimal shutter speed is tl when the movement velocity is Vb to Vc; . . .

the optimal shutter speed is tr when the movement velocity is Vg to Vh; and the optimal shutter speed is ts when the movement velocity is Vh or more.

In this way, the table in which optimal shutter speeds corresponding to data of each zone of movement velocities are set may be generated based on the graph shown in FIG. 15, and this correspondence table may be held. With this configuration, the amount of data that should be held by the optimal shutter speed calculating unit 253 can be reduced. In this case, advantage can be obtained in terms of a calculation cost. That is, when the optimal shutter speed calculating unit 253 calculates an imaging shutter speed optimal to an area by inputting movement velocity information of the area, the optimal shutter speed calculating unit 253 can obtain the optimal imaging shutter speed corresponding to the movement velocity only by determining the zone corresponding to the movement velocity in the table shown in FIG. 16 and obtaining the optimal shutter speed data corresponding to the zone.

<9. Specific Example of Calculation of an Optimal Imaging Shutter Speed and an Output Frame Generating Process>

Next, a specific example of calculation of an optimal imaging shutter speed and an output frame generating process is described with reference to FIGS. 17 to 19.

In the following description, too, the frame rates are set as follows:
the frame rate of input images is 240 (frames/second); and
the frame rate of output images is 60 (frames/second).

In this example, assume that each frame of input images is captured at a single shutter speed 1/240 (seconds).

Figure 17:
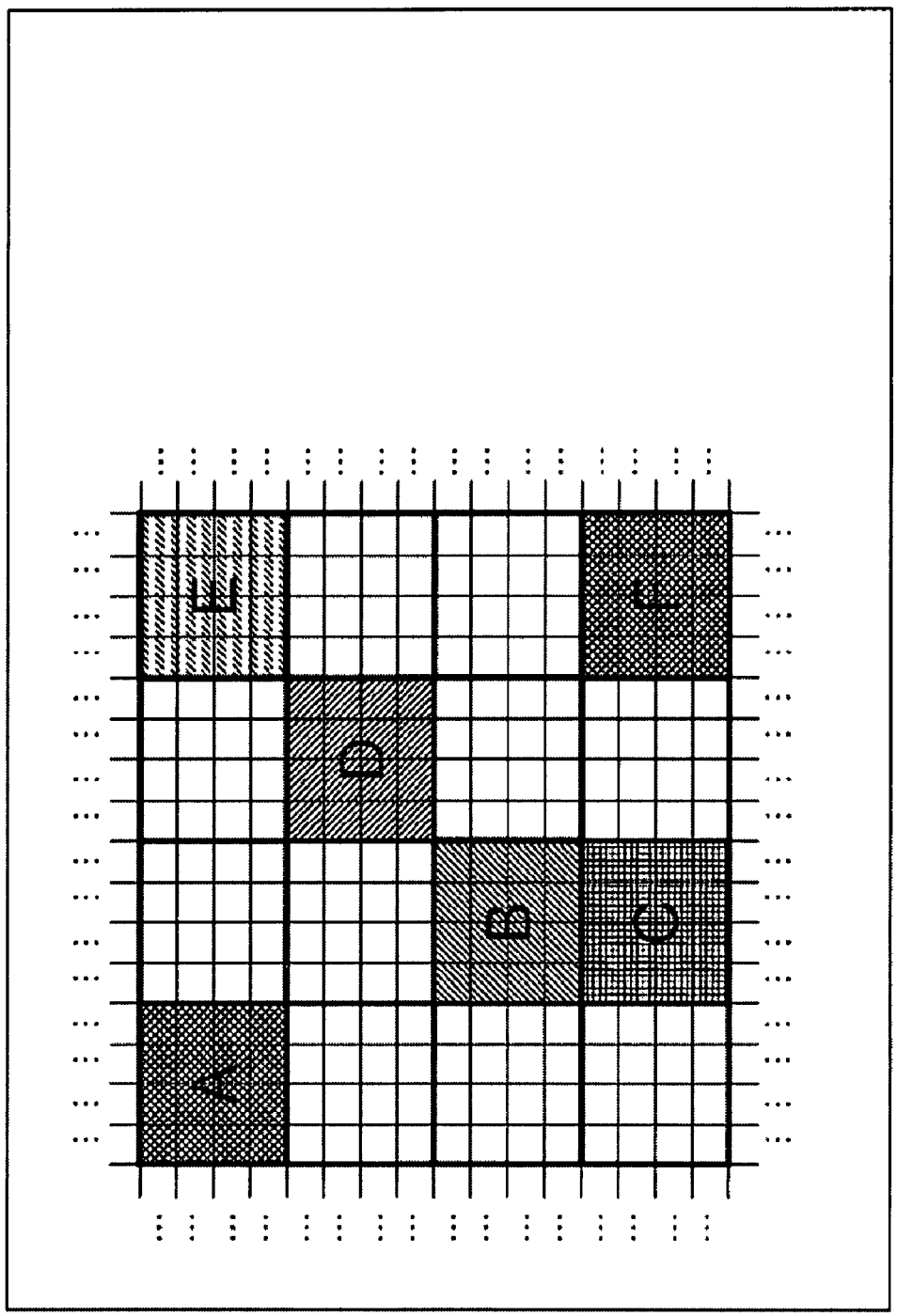
FIG. 17 shows a search frame in which movement velocities in the respective partial areas have been calculated in the movement velocity calculating unit.

FIG. 17 shows a search frame in which the movement velocities in the respective partial areas have been calculated in the movement velocity calculating unit 101 (see FIG. 4) of the image processing apparatus according to the present invention. In this example, the image frame is divided into areas, each area having 4×4 pixels, and movement velocities are detected in units of the partial areas of 4×4 pixels. The image frame is divided into areas of 4×4 pixels in the frame dividing unit 203 of the movement velocity calculating unit 101 described above with reference to FIG. 7, and the value of the corresponding movement velocity is calculated in each of the areas.

The movement velocities in the respective partial areas are calculated by performing the movement velocity detecting process described above with reference to FIGS. 7 to 9, that is, by setting a search frame and reference frames and performing block matching among these frames.

Identification symbols A to F are assigned to six partial areas among the partial areas shown in FIG. 17. Here, the movement velocities calculated in these partial areas A to E are Va, Vb, Vc, Vd, Ve, and Vf, respectively.

Figure 18:
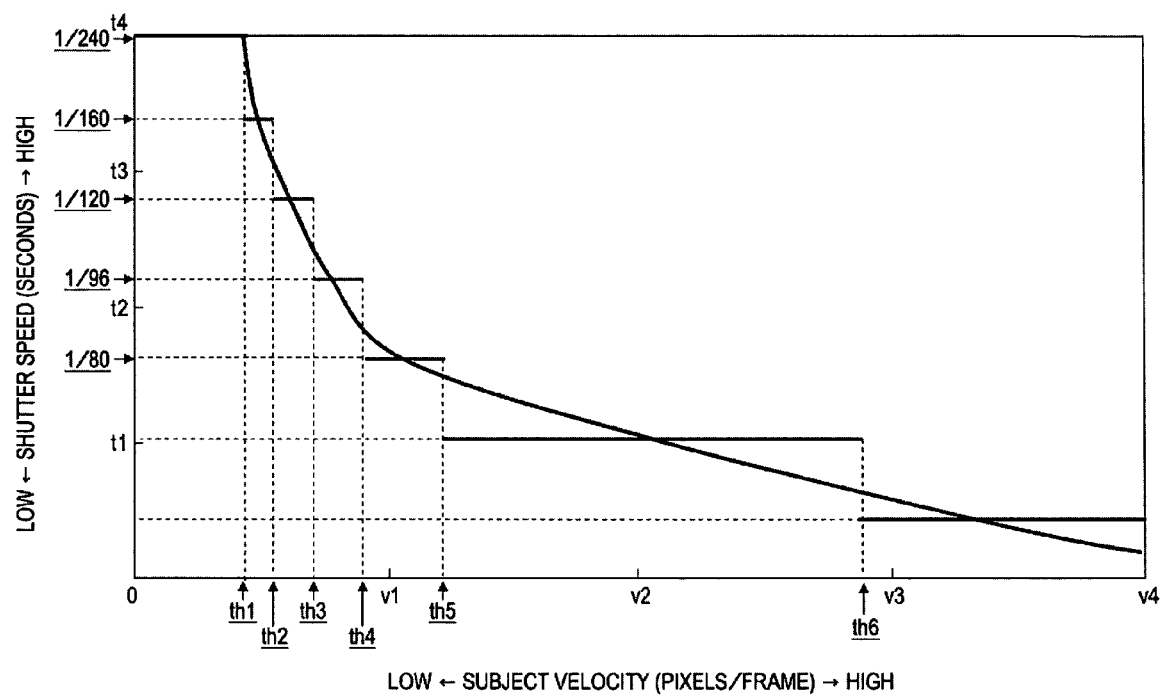
FIG. 18 shows a graph (table) applied to calculation of optimal imaging shutter speeds based on movement velocities, the calculated being performed in the image generation processing unit.

FIG. 18 shows a graph (table) applied to calculation of optimal imaging shutter speeds based on movement velocities performed in the image generation processing unit 102. This table is held in the optimal shutter speed calculating unit 253 of the image generation processing unit 102, which has been described above with reference to FIG. 11, and is correspondence data between movement velocities and optimal imaging shutter speeds. The optimal shutter speed calculating unit 253 calculates optimal shutter speeds corresponding to the respective partial areas based on the movement velocities corresponding to the respective partial areas by applying this table. In the data shown in FIG. 18, optimal shutter speeds are associated with predetermined zones of movement velocities, as in the graph described above with reference to FIG. 15.

The optimal shutter speed calculating unit 253 receives movement velocity information corresponding to the respective partial areas and calculates optimal shutter speeds corresponding to the respective partial areas by applying the data shown in FIG. 18. Hereinafter, an example of a process in a case where the frame image data shown in FIG. 17 is input to the image generation processing unit 102 as a search frame corresponding to an output image frame is described.

The movement velocity information of the respective partial areas of the frame image shown in FIG. 17 is input to the optimal shutter speed calculating unit 253 of the image generation processing unit 102 shown in FIG. 11. The movement velocity information Va to Vf are input for the partial areas A to F (4×4 pixels).

Here, assume that the relationship between the values of movement velocities Va to Vf of the partial areas A to F shown in FIG. 17 and thresholds th1 to th6 shown along the horizontal axis of the graph shown in FIG. 18 is as follows.

$0 \leq Va < th1$
$th1 \leq Vb < th2$
$th2 \leq Vc < th3$
$th3 \leq Vd < th4$
$th4 \leq Ve < th5$
$th6 \leq Vf$ As described above, the process of calculating an optimal imaging shutter speed of an area based on the movement velocity in the area is performed by determining the zone among the movement velocity zones defined by the above-mentioned thresholds corresponding to the movement velocity and then obtaining the optimal shutter speed corresponding to the movement velocity zone.

For example, the partial area C shown in FIG. 17 has the movement velocity Vc. Since $th2 \leq Vc < th3$ is satisfied, the movement velocity Vc is included in the movement velocity zone th2 to th3. The optimal shutter speed corresponding to the movement velocity zone th2 to th3 is [1/120 seconds] according to the graph shown in FIG. 18. Accordingly, it is determined that the optimal shutter speed in the partial area C having the movement velocity Vc is [1/120 seconds]. This means that, when the image in the partial area C is a pseudo image having a shutter speed of 1/120 seconds, jerkiness and blur can be reduced to a maximum extent in that image.

This shutter speed information is input to the filtering processing unit 254 of the image generation processing unit 102 shown in FIG. 11. The filtering processing unit 254 performs an image generating process (filtering process) to transform the image in the partial area C into a pseudo image having a shutters speed of 1/120 seconds. The image filtering process is performed as a process of blending existing frames by weighting them, as described above with reference to FIG. 12.

Hereinafter, the filtering process performed in the filtering processing unit 254, that is, a process of generating a pseudo image captured at a shutter speed in which jerkiness and blur are reduced to a maximum extent, is described with reference to FIG. 19.

The optimal shutter speed information corresponding to the respective areas are input to the filtering processing unit 254. Also, as described above with reference to FIG. 12, the input image frames that are selected in the control unit 252 of the image generation processing unit 102 shown in FIG. 11 and that are applied to the filtering process are input to the filtering processing unit 254. In this example, the frames used in the filtering process are the two frames before the search frame of the movement velocities and the two frames after the search frame, as in (example 2) described above with reference to FIG. 12.

Figure 19:
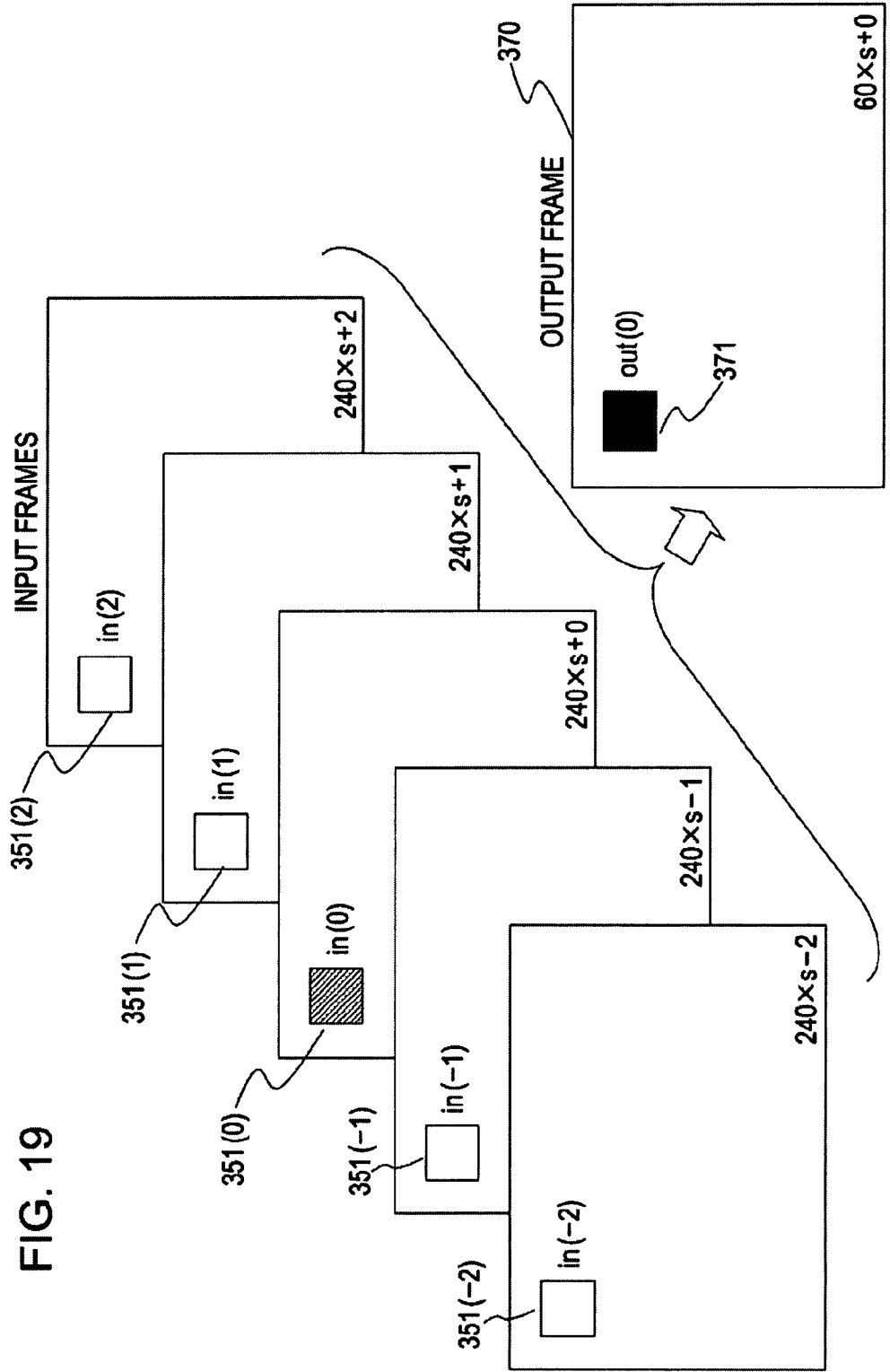
FIG. 19 illustrates a filtering process using frames.

FIG. 19 shows five frames input to the filtering processing unit 254: a search frame of movement velocities corresponding to an output image frame; the two frames before the search frame; and the two frames after the search frame. These five frames are the 240×s+zeroth frame, which is the search frame of movement velocities corresponding to an output image frame, and the frames used in filtering: the 240×s−second frame and the 240×s−first frame before the search frame; and the 240×s+first frame and the 240×s+second frame after the search frame. Pixels 351(−2) to 351(2) in these input frames are included in one of the partial areas of 4×4 pixels to be processed, described above with reference to FIG. 17. The values of the pixels 351(−2) to 351(2) in the input frames are in(−2), in(−1), in(0), in(1), and in(2), respectively.

FIG. 19 also shows an output frame 370 that is output as a result of the filtering process using those respective frames. This frame corresponds to the [60×s+zeroth output frame] 320 in (example 2) shown in FIG. 12. In the output frame 370, the pixel value of an output pixel 371 that positionally corresponds to the target pixels 351(−2) to 351(2) is out(0).

In this example, the pixel value out(0) of the output pixel 371 in the output frame is calculated by weighted-averaging the pixel values in(−2), in(−1), in(0), in(1), and in(2) of the target pixels 351(−2) to 351(2) in the respective input image frames. Hereinafter, this is described by using examples.

(A) When the Target Pixel is a Pixel in the Partial Area A

First, an example where the target pixel exists in the area A shown in FIG. 17 is described.

The target pixel has the movement velocity Va ($0 \leq Va < th1$).

In this case, the optimal shutter speed for the target pixel has already been calculated from the table shown in FIG. 18 by the optimal shutter speed calculating unit 253 and input to the filtering processing unit 254. The value is 1/240 (seconds).

Each frame of the input images is captured at a single shutter speed of 1/240 (seconds). Thus, the pixel value of the target pixel in the 240×s+zeroth input frame is the image captured at the optimal shutter speed (1/240 seconds) calculated from the table shown in FIG. 18. The value in(0) can be used as the pixel value out(0) of the target pixel in the output frame. This can be expressed by the following expression:

$$out(0)=in(0).$$

(B) When the Target Pixel is a Pixel in the Partial Area B

Next, a case where the target pixel exists in the area B shown in FIG. 17 is described.

The target pixel has the movement velocity Vb ($th3 \leq Vb < th2$).

In this case, the optimal shutter speed for the target pixel has already been calculated from the table shown in FIG. 18 by the optimal shutter speed calculating unit 253 and input to the filtering processing unit 254. The value is 1/160 (seconds).

Each frame of the input images is captured at a single shutter speed of 1/240 (seconds). The optimal shutter speed 1/160 (seconds) for the target pixel is 1.5 times=(1/160)/1/240).

In this case, the pixel value out(0) of the target pixel in the output frame is obtained by calculating a weighted average of the pixel values of the target pixels in the respective frames of the input images, as in the following manner.

$$out(0)=(in(-1)*0.25+in(0)+in(1)*0.25)/1.5$$

In this expression, the weight of the pixel value of the pixel in the 240×s+zeroth frame, which is a search frame of movement velocities corresponding to an output image frame, is set to [1], and the weights of the pixel values of corresponding pixels in the previous frame and the next frame are set to [0.25]. Then, the pixel value out(0) of the output image frame is calculated by weighted averaging. With the above-described expression, a pseudo pixel captured with exposure time longer by 1.5 times than original exposure time of the target pixel can be generated.

(C) When the Target Pixel is a Pixel in the Partial Area C

Next, a case where the target pixel exists in the area C shown in FIG. 17 is described.

The target pixel has the movement velocity Vc ($th2 \leq Vc < th3$).

In this case, the optimal shutter speed for the target pixel has already been calculated from the table shown in FIG. 18 by the optimal shutter speed calculating unit 253 and input to the filtering processing unit 254. The value is 1/120 (seconds).

Each frame of the input images is captured at a single shutter speed of 1/240 (seconds). The optimal shutter speed 1/120 (seconds) for the target pixel is 2.0 times=(1/120)/(1/240).

In this case, the pixel value out(0) of the target pixel in the output frame is obtained by calculating a weighted average of the pixel values of the target pixels in the respective frames of the input images, as in the following manner.

$$out(0)=(in(-1)*0.5+in(0)+in(1)*0.5)/2.0$$

With the above-described expression, a pseudo pixel captured with exposure time longer by 2.0 times than original exposure time of the target pixel can be generated.

(D) When the Target Pixel is a Pixel in the Partial Area D

Next, a case where the target pixel exists in the area D shown in FIG. 17 is described.

The target pixel has the movement velocity Vd ($th3 \leq Vd < th4$).

In this case, the optimal shutter speed for the target pixel has already been calculated from the table shown in FIG. 18 by the optimal shutter speed calculating unit 253 and input to the filtering processing unit 254. The value is 1/96 (seconds).

Each frame of the input images is captured at a single shutter speed of 1/240 (seconds). The optimal shutter speed 1/96 (seconds) for the target pixel is 2.5 times=(1/96)/(1/240).

In this case, the pixel value out(0) of the target pixel in the output frame is obtained by calculating a weighted average of the pixel values of the target pixels in the respective frames of the input images, as in the following manner.

$$out(0)=(in(-1)*0.75+in(0)+in(1)*0.75)/2.5$$

With the above-described expression, a pseudo pixel captured with exposure time longer by 2.5 times than original exposure time of the target pixel can be generated.

(E) When the Target Pixel is a Pixel in the Partial Area E

Next, a case where the target pixel exists in the area E shown in FIG. 17 is described.

The target pixel has the movement velocity Ve ($th4 \leq Ve < th5$).

In this case, the optimal shutter speed for the target pixel has already been calculated from the table shown in FIG. 18 by the optimal shutter speed calculating unit 253 and input to the filtering processing unit 254. The value is 1/80 (seconds).

Each frame of the input images is captured at a single shutter speed of 1/240 (seconds). The optimal shutter speed 1/80 (seconds) for the target pixel is 3.0 times=(1/80)/(1/240).

In this case, the pixel value out(0) of the target pixel in the output frame is obtained by calculating a weighted average of the pixel values of the target pixels in the respective frames of the input images, as in the following manner.

$$out(0)=(in(-1)+in(0)+in(1))/3.0$$

With the above-described expression, a pseudo pixel captured with exposure time longer by 3.0 times than original exposure time of the target pixel can be generated.

(F) When the Target Pixel is a Pixel in the Partial Area F

Next, a case where the target pixel exists in the area F shown in FIG. 17 is described.

The target pixel has the movement velocity Vf ($th6 \leq Vf$).

In this case, the optimal shutter speed for the target pixel has already been calculated from the table shown in FIG. 18 by the optimal shutter speed calculating unit 253 and input to the filtering processing unit 254. The value is 1/60 (seconds).

Each frame of the input images is captured at a single shutter speed of 1/240 (seconds). The optimal shutter speed 1/60 (seconds) for the target pixel is 4.0 times=(1/60)/(1/240).

In this case, the pixel value out(0) of the target pixel in the output frame is obtained by calculating a weighted average of the pixel values of the target pixels in the respective frames of the input images, as in the following manner.

$$out(0)=(in(-2)*0.5+in(-1)+in(0)+in(1)+in(2)*0.5)/4.0$$

With the above-described expression, a pseudo pixel captured with exposure time longer by 4.0 times than original exposure time of the target pixel can be generated.

In this way, the filtering processing unit 254 performs the filtering process by weighted-averaging the pixel values of input image frames while setting a coefficient according to the movement velocity and generates images in which the pixel values are set, in order to generate an output frame in which the respective pixels are captured at optimal shutter speeds.

In this way, the filtering processing unit 254 performs the process by appropriately changing the number of input image frames applied to the filtering process in accordance with the shutter speed of the output image to be generated.

<10. Apparatus Having a Function of Adjusting a Curve of Movement Velocities and Optimal Shutter Speeds>

Furthermore, in the apparatus provided with the image processing configuration according to the present invention, a function of adjusting the relationship between movement velocities and optimal imaging shutter speeds can be provided in accordance with a response characteristic of the display device displaying output images and preference of a user of the apparatus.

Figure 20:
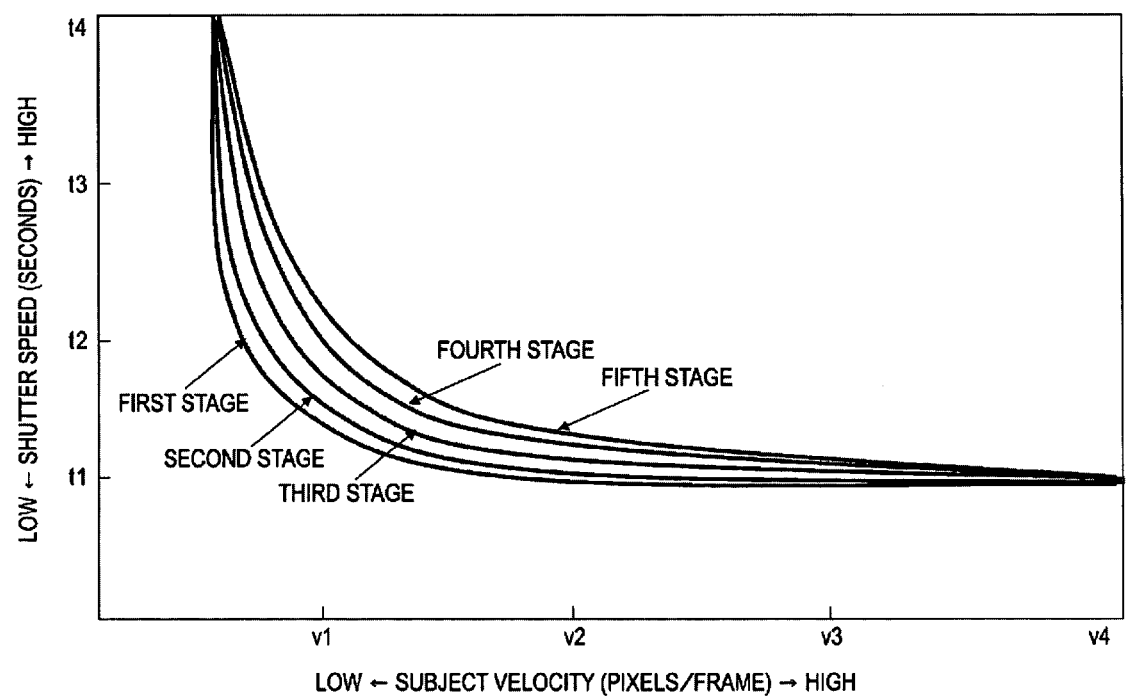
FIG. 20 shows an example of a plurality of different curves, each indicating the relationship between movement velocities and optimal imaging shutter speeds.

FIG. 20 shows several examples of a curve indicating the relationship between movement velocities and optimal imaging shutter speeds. For example, a user can adjust the relationship between movement velocities and optimal imaging shutter speeds among the curves of first to fifth stages shown in FIG. 20. The relationship between movement velocities and optimal imaging shutter speeds may vary in accordance with a response characteristic of the display device displaying output images and preference of a user of the apparatus. In that case, by allowing adjustment of the relationship between movement velocities and optimal imaging shutter speeds, an optimal process according to the situation can be performed.

For example, among the plurality of curves indicating the relationship between movement velocities and optimal imaging shutter speeds shown in FIG. 20, the first stage is compared with the fifth stage. In that case, the optimal imaging shutter speed is higher in the fifth stage at each movement velocity. Thus, in the output images generated through the filtering process, degradation due to jerkiness is smaller in the first stage than in the fifth stage. On the other hand, degradation due to blur is smaller in the fifth stage than in the first stage.

The user of the apparatus can adjust the optimal shutter speed corresponding to each movement velocity by selecting one of the curves of the first to fifth stages shown in FIG. 20 in accordance with his/her preference so that degradation due to both jerkiness and blur can be reduced to a maximum extent. This function of adjusting the relationship between movement velocities and optimal imaging shutter speeds is similar to a function of adjusting a gamma curve of brightness in a typical display device.

Figure 21:
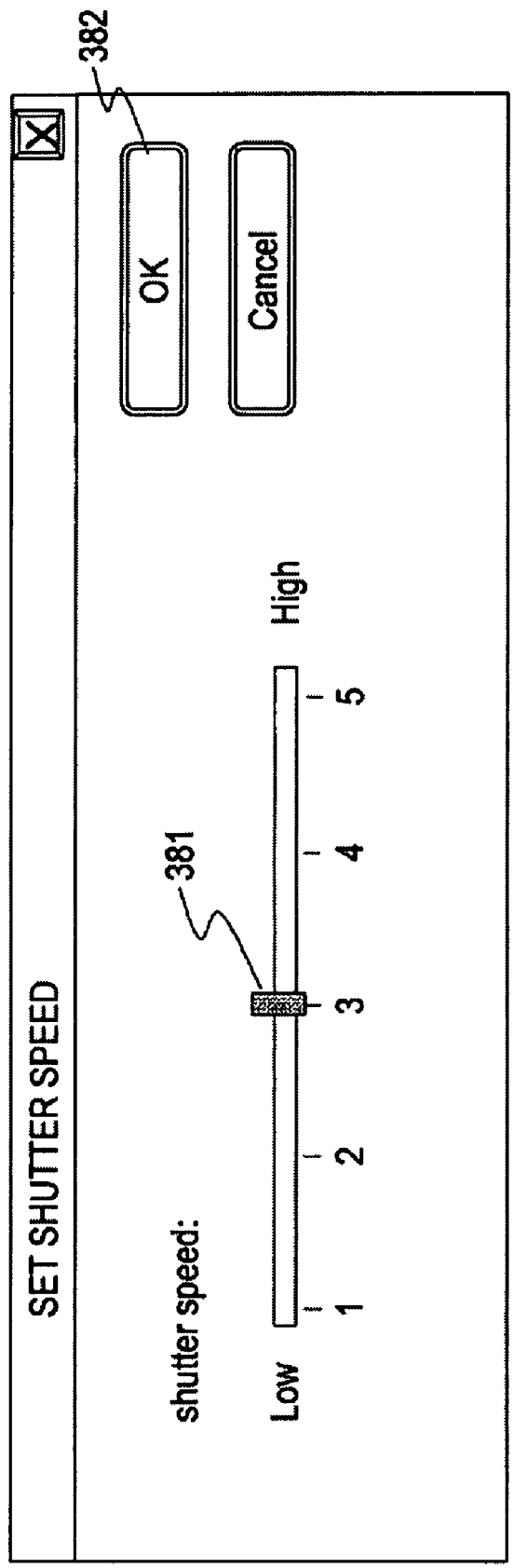
FIG. 21 shows an interface that is configured so that a user can select one of the plurality of different curves, each indicating the relationship between movement velocities and optimal imaging shutter speeds.

Various configurations can be applied as means for inputting information necessary for adjusting the relationship between movement velocities and optimal imaging shutter speeds. For example, the information can be input through a user interface (GUI) provided in the apparatus. In this case, the apparatus has a display device and an input device such as a mouse, and the user performs adjustment by using the input device. FIG. 21 shows an example of a configuration of the user interface that is used by the user to adjust the relationship between movement velocities and optimal imaging shutter speeds.

In the design shown in FIG. 21, the user can select a relationship between movement velocities and optimal imaging shutter speeds from among the curves of the first to fifth stages shown in FIG. 20. The selection can be input by moving a scroll bar 381. The user can adjust the relationship between movement velocities and optimal imaging shutter speeds by moving the scroll bar 381 by using an input device and operating an OK button 382.

<11. Outline of a Second Embodiment>

Figure 22:
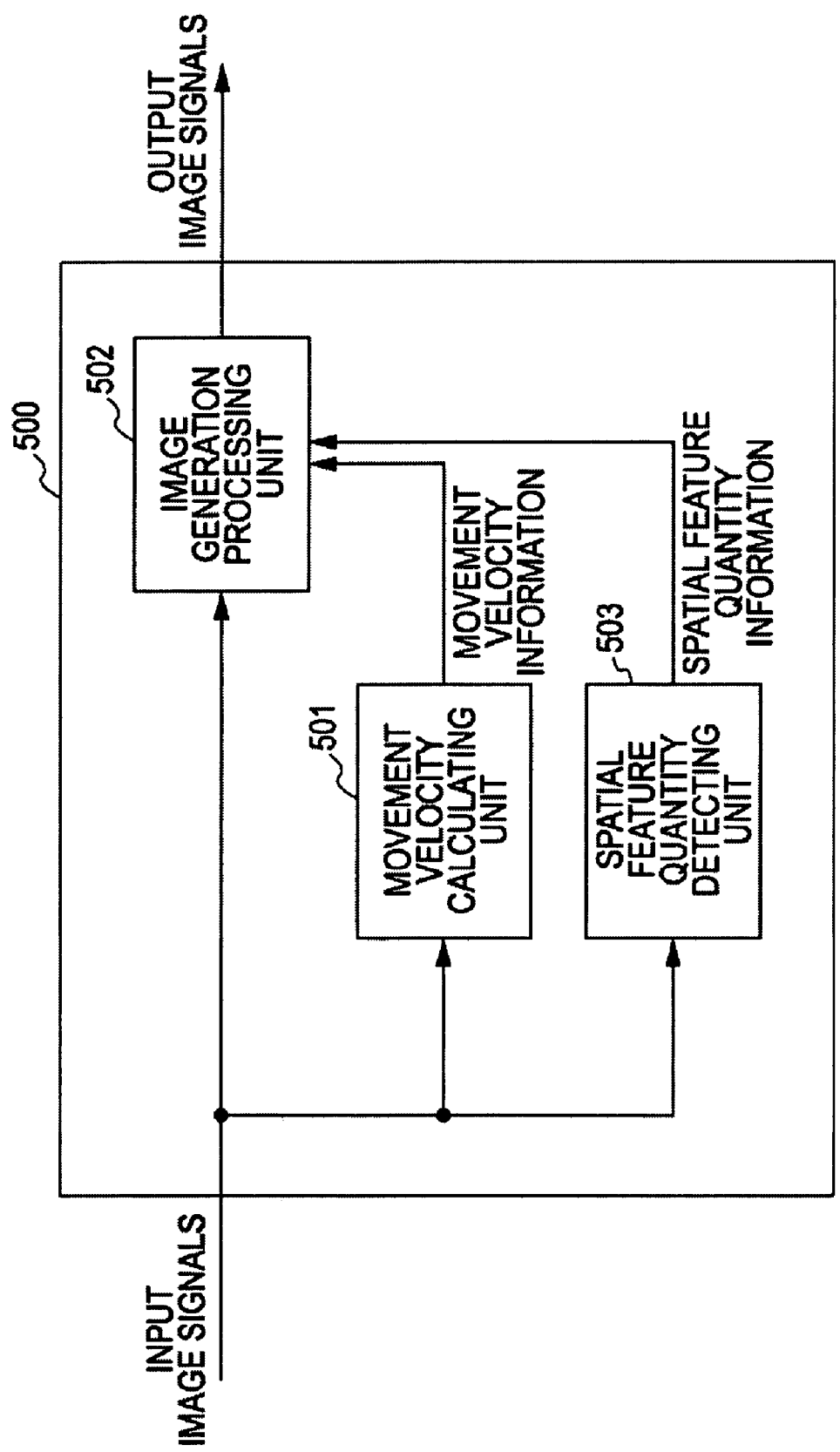
FIG. 22 is a block diagram showing an example of a configuration of an image processing apparatus according to a second embodiment of the present invention.

FIG. 22 is a block diagram showing an example of a configuration of an image processing apparatus according to a second embodiment of the present invention. The configuration in the block diagram according to the second embodiment is equivalent to that of the first embodiment described above with reference to FIG. 4 added with a spatial feature quantity detecting unit 503. An image processing apparatus 500 receives image signals having a certain frame rate as images to be processed. The input image signals are input to a movement velocity calculating unit 501, an image generation processing unit 502, and the spatial feature quantity detecting unit 503.

Hereinafter, a process performed in the image processing apparatus 500, mainly a difference from the first embodiment, is described. The input image signals having a certain frame rate are input to the movement velocity calculating unit 501. The movement velocity calculating unit 501 performs the same process as that in the first embodiment described above with reference to FIG. 4 and so forth on the input image signals so as to calculate the movement velocities in the respective partial areas in each frame. The movement velocities are calculated as values corresponding to the frame rate of output images and are output from the movement velocity calculating unit 501 to the image generation processing unit 502.

Figure 23:
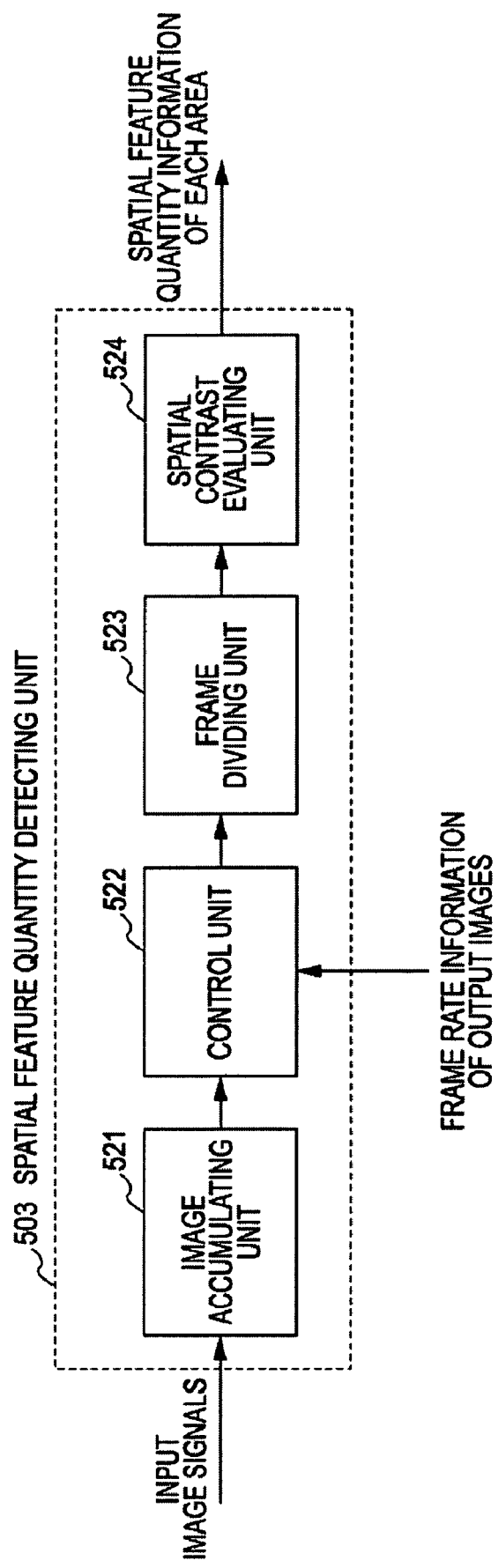
FIG. 23 shows an example of a specific configuration of a spatial feature quantity detecting unit.

The input image signals are also input to the spatial feature quantity detecting unit 503. A process in the spatial feature quantity detecting unit 503 is described with reference to FIG. 23. FIG. 23 shows an example of a specific configuration of the spatial feature quantity detecting unit 503. As shown in FIG. 23, the spatial feature quantity detecting unit 503 includes an image accumulating unit 521 to store a plurality of frames of input image signals, a control unit 522 to select a frame in which the level of spatial contrast is to be evaluated and perform read control, a frame dividing unit 523 to divide a frame to be evaluated into areas, and a spatial contrast evaluating unit 524 to evaluate the level of spatial contrast in each area by a spatial filtering process or the like.

In this embodiment, the spatial contrast evaluating unit 524 has a spatial contrast threshold, which is used as a reference of a process. The spatial feature quantity detecting unit 503 determines whether the level of spatial contrast is equal to or higher than the threshold in each of the partial areas to be processed. If the level of spatial contrast is equal to or higher than the threshold in the partial area to be processed, the spatial feature quantity detecting unit 503 outputs a signal [0] as spatial feature quantity information. If the level of spatial contrast is lower than the threshold, the spatial feature quantity detecting unit 503 outputs a signal [1] as spatial feature quantity information.

The input image signals input to the spatial feature quantity detecting unit 503 are input to the image accumulating unit 521 first and are stored therein. In the stored image frame data, a frame selected as an evaluation target of spatial contrast is read from the image accumulating unit 521 under control by the control unit 522.

The frame as an evaluation target of spatial contrast is selected based on the frame rate information of output images. This frame selecting process is the same as the process of selecting a search frame in which motion vectors are detected performed in the control unit in the movement velocity calculating unit described above with reference to FIGS. 7 to 9. The frame read from the image accumulating unit 521 is input to the frame dividing unit 523.

The frame dividing process performed in the frame dividing unit 523 is performed in the same manner as in the frame dividing process on the search frame in which motion vectors are detected performed in the frame dividing unit of the movement velocity calculating unit described above with reference to FIG. 7 in the first embodiment. As described above with reference to FIG. 5, the image of one frame is divided into predetermined pixel areas.

Image data of each partial area is input to the spatial contrast evaluating unit 524, where a spatial filtering process is performed. That is, in each of the partial areas to be processed, it is determined whether the level of spatial contrast is equal to or higher than the threshold. If the level of spatial contrast in the partial area to be processed is equal to or higher than the threshold, a signal [0] is output as spatial feature quantity information. If the level of spatial contrast in the partial area to be processed is lower than the threshold, a signal [1] is output as spatial feature quantity information.

As described above, according to this embodiment, the image generation processing unit 502 shown in FIG. 22 receives movement velocity information in each area of images output from the movement velocity calculating unit 501 and spatial feature quantity information in each area of images output from the spatial feature quantity detecting unit 503.

With reference to FIG. 24, the configuration and process of the image generation processing unit 502 according to this embodiment is described. In the image generation processing unit 502 shown in FIG. 24, the spatial feature quantity information input from the spatial feature quantity detecting unit 503 is input to an optimal shutter speed calculating unit 553, as the movement velocity information. The optimal shutter speed calculating unit 553 calculates the optimal shutter speeds corresponding to the respective partial areas by applying the information.

The process in the optimal shutter speed calculating unit 553 is performed in the following manner, for example. When the spatial feature quantity information input to the optimal shutter speed calculating unit 553 is a signal [0], that is, when the level of spatial contrast in the partial area to be processed is equal to or higher than the threshold, an optimal imaging shutter speed for the area is calculated based on only the movement velocity information based on the correspondence table between movement velocities and optimal shutter speeds described above with reference to FIGS. 13 to 17.

On the other hand, when the spatial feature quantity information is a signal [1], that is, when the level of spatial contrast in the partial area to be processed is lower than the threshold, the shutter speed corresponding to the maximum frame rate, for example, t4 in FIG. 13, is set as the optimal shutter speed regardless of the movement velocity in the area.

This process of determining an optimal shutter speed is based on the fact that degradation due to jerkiness is not conspicuous in an area of low spatial contrast. That is, when the spatial feature quantity information in the partial area to be processed is a signal [1], the level of spatial contrast in the partial area to be processed is lower than the threshold, the spatial contrast is low, and degradation due to jerkiness is not conspicuous. Therefore, in such an area, the shutter speed corresponding to the maximum frame rate, for example, t4 in FIG. 13, is set as the shutter speed, so as to output a clear image.

On the other hand, when the spatial feature quantity information in the partial area is a signal [0], the level of spatial contrast in the partial area to be processed is equal to or higher than the threshold, the spatial contrast is high, and degradation due to jerkiness is conspicuous in that area. Therefore, as in the above-described embodiment, an optimal imaging shutter speed is calculated based on the correspondence table between movement velocities and optimal shutter speeds described above with reference to FIGS. 13 to 17.

In this embodiment, the spatial feature quantity information is classified into two types: [0] and [1], based on the predetermined threshold. However, another setting may also be used. For example, the threshold held in the spatial feature quantity detecting unit 503 is not always only one. Alternatively, the spatial feature quantity detecting unit 503 can have a more specific table to output different output values in accordance with the value of contrast, and signals of three or more types can be output as the spatial feature quantity information to the image generation processing unit 502.

In the optimal shutter speed calculating unit 553 of the image generation processing unit 502 shown in FIG. 24, the process performed after optimal imaging shutter speeds in the respective areas in images have been calculated, that is, the process in a filtering processing unit 554, is the same as that described above in the previous embodiment. The process is performed as a process of generating a pseudo image corresponding to an optimal shutter speed in each partial area based on a plurality of input image frames.

As described above, in this processing example, the spatial feature quantity detecting unit 503 detects the level of spatial contrast in units of partial areas. In the image generation processing unit 502, a shutter speed higher than the optimal imaging shutter speed calculated based on a movement velocity is set as an optimal shutter speed in a partial area where the spatial contrast is lower than the predetermined threshold. Alternatively, in a partial area where the spatial contrast is lower than the predetermined threshold, an optimal imaging shutter speed calculated based on a movement velocity is not calculated, but a maximum shutter speed corresponding to the frame rate of input images may be set as an optimal shutter speed.

The present invention has been described in detail above with reference to the specific embodiments. However, it is obvious that those skilled in the art can make modifications and alterations of the embodiments without deviating from the scope of the present invention. That is, the present invention has been disclosed in a form of examples and should not be interpreted in a limited manner. For determination of the scope of the present invention, claims should be considered.

The series of processes described in this description can be performed by hardware, software, or a combination of the both. When the processes are performed by software, a program including a processing sequence can be executed by being installed to a memory in a computer incorporated in a dedicated hardware or can be executed by being installed to a multi-purpose computer capable of executing various processes.

For example, the program can be recorded in advance in a hard disk or a ROM (read only memory) as a recording medium. Alternatively, the program can be temporarily or permanently stored (recorded) in a removable recording medium, such as a flexible disk, a CD-ROM (compact disc read only memory), an MO (magneto-optical) disc, a DVD (digital versatile disc), a magnetic disk, or a semiconductor memory. Such a removable recording medium can be provided as a so-called package software.

The program can be installed to a computer from the above-described removable recording medium. Alternatively, the program can be wirelessly transferred from a download site to a computer or transferred through a network, such as a LAN (local area network) or the Internet, in a wired manner. The computer can receive the program transferred in that way and install it in a recording medium, such as a hard disk included therein.

The various processes described in the description may be performed in time series in accordance with the description. Alternatively, the processes may be performed in parallel or individually in accordance with the processing ability of an apparatus performing the processes or as necessary. In this description, a system means a logical set of a plurality of devices, and the devices of respective configurations are not always in the same casing.

INDUSTRIAL APPLICABILITY

As described above, according to the configuration of the present invention, at generation of moving images to be output at a certain frame rate, movement velocities of a subject according to the frame rate of the output images are calculated in units of partial areas in each frame image constituting the moving images, optimal shutter speeds to reduce degradation of the output images are obtained as optimal imaging shutter speeds corresponding to the movement velocities in units of partial areas, images corresponding to the obtained optimal shutter speeds are generated in units of partial areas, and frame images generated by combining the generated partial area images are output. According to this configuration, an image processing apparatus capable of outputting high-quality images in which degradation in output images is reduced, specifically, both jerkiness and blur are reduced, is realized.

The invention claimed is:

1. An image processing apparatus to perform image processing on moving images, the image processing apparatus comprising:
   a movement velocity calculating unit to calculate movement velocities of a subject according to a frame rate of output images in units of partial areas in each frame image constituting the moving images, the movement velocity calculating unit including:
      a block matching unit to obtain motion vectors in units of the partial areas by using a block matching process applying a search frame and a reference frame that are selected from among frames of input images; and
      a motion vector standardizing unit to calculate movement velocities of a subject according to the frame rate of the output images based on motion vector information calculated in the block matching unit; and
   an image generation processing unit to receive movement velocity information of the respective partial areas, obtain optimal imaging shutter speeds that correspond to the movement velocities and that reduce degradation of the output images in units of the partial areas, generate images corresponding to the obtained optimal shutter speeds in units of the partial areas, and output each frame image generated by combining the generated partial area images.

2. The image processing apparatus according to claim 1, wherein the movement velocity calculating unit performs a process of selecting the search frame from among the frames of the input images at frame intervals according to the frame rate of the output images.

3. The image processing apparatus according to claim 1, wherein the image generation processing unit holds a table associating movement velocities with imaging shutter speeds to reduce degradation of the output images and obtains optimal shutter speeds corresponding to respective movement velocities in units of the partial areas by referring to the table.

4. The image processing apparatus according to claim 3, wherein the table associates movement velocity zone information with optimal shutter speed information.

5. The image processing apparatus according to claim 3, wherein the image generation processing unit holds a plurality of different tables each indicating correspondence between movement velocities and optimal shutter speeds to reduce degradation of the output images and determines a table to be applied based on user selection information.

6. The image processing apparatus according to claim 1, wherein the image generation processing unit includes:
   an optimal shutter speed calculating unit to calculate optimal shutter speeds corresponding to movement velocities in units of the partial areas; and
   a filtering processing unit to generate images corresponding to the optimal shutter speeds calculated by the optimal shutter speed calculating unit in units of the partial areas.

7. The image processing apparatus according to claim 6, wherein the filtering processing unit performs a process of generating images corresponding to the imaging shutter speeds calculated by the optimal shutter speed calculating unit in units of the partial areas based on a frame selected from among frames of input images.

8. The image processing apparatus according to claim 6, wherein the filtering processing unit performs a process of setting a weighting coefficient according to the optimal shutter speeds calculated by the optimal shutter speed calculating unit, performing weighted averaging of pixel values of a plurality of frames of input images, and determining pixel values of output image frames.

9. The image processing apparatus according to claim 1, wherein the image generation processing unit includes an intermediate frame generating unit to generate an intermediate frame that is not included in frames of input images, and performs a process of generating images corresponding to the optimal shutter speeds calculated by the optimal shutter speed calculating unit in units of the partial areas by applying the intermediate frame.

10. The image processing apparatus according to claim 1, further comprising:
   a spatial feature quantity detecting unit to detect a level of spatial contrast in units of the partial areas,
   wherein the image generation processing unit performs a process of setting a shutter speed higher than the optimal shutter speed calculated according to the movement velocity as an optimal shutter speed in the partial area where the spatial contrast is lower than a predetermined threshold.

11. The image processing apparatus according to claim 1, further comprising:
   a spatial feature quantity detecting unit to detect a level of spatial contrast in units of the partial areas, wherein the image generation processing unit performs a process of setting a shutter speed corresponding to a frame rate of input images as an optimal shutter speed without calculating an optimal shutter speed corresponding to the movement velocity in the partial area where the spatial contrast is lower than a predetermined threshold.

12. The image processing apparatus according to any of claims 1 and 2-5,
wherein the degradation of the output images is degradation due to jerkiness and blur, and
wherein the image generation processing unit performs a process of obtaining optimal shutter speeds to reduce image degradation due to jerkiness and blur in units of the partial areas and generating images corresponding to the obtained optimal shutter speeds in units of the partial areas.

13. An image processing method for performing image processing on moving images in an image processing apparatus, the image processing method comprising:
a movement velocity calculating step of calculating movement velocities of a subject according to a frame rate of output images in units of partial areas in each frame image constituting the moving images, this step being performed in a movement velocity calculating unit, the movement velocity calculating step including:
a block matching step of obtaining motion vectors in units of the partial areas by using a block matching process applying a search frame and a reference frame that are selected from among frames of input images; and
a motion vector standardizing step of calculating movement velocities of a subject according to the frame rate of the output images based on motion vector information calculated in the block matching step; and
an image generation processing step of receiving movement velocity information of the respective partial areas, obtaining optimal imaging shutter speeds that correspond to the movement velocities and that reduce degradation of the output images in units of the partial areas, generating images corresponding to the obtained optimal shutter speeds in units of the partial areas, and outputting each frame image generated by combining the generated partial area images, this step being performed in an image generation processing unit.

14. The image processing method according to claim 13, wherein the movement velocity calculating step performs a process of selecting the search frame from among the frames of the input images at frame intervals according to the frame rate of the output images.

15. The image processing method according to claim 13, wherein the image generation processing step includes a step of obtaining optimal shutter speeds corresponding to respective movement velocities in units of the partial areas by referring to a table associating the movement velocities with the imaging shutter speeds to reduce degradation of the output images.

16. The image processing method according to claim 15, wherein the table associates movement velocity zone information with optimal shutter speed information.

17. The image processing method according to claim 15, wherein the image generation processing step includes a step of performing a process of determining a table to be applied based on user selection information, among a plurality of different tables each indicating correspondence between movement velocities and optimal shutter speeds to reduce degradation of the output images.

18. The image processing method according to claim 13, wherein the image generation processing step includes:
an optimal shutter speed calculating step of calculating optimal shutter speeds corresponding to movement velocities in units of the partial areas; and
a filtering processing step of generating images corresponding to the optimal shutter speeds calculated in the optimal shutter speed calculating step in units of the partial areas.

19. The image processing method according to claim 18, wherein the filtering processing step performs a process of generating images corresponding to the imaging shutter speeds calculated in the optimal shutter speed calculating step in units of the partial areas based on a frame selected from among frames of input images.

20. The image processing method according to claim 18, wherein the filtering processing step performs a process of setting a weighting coefficient according to the optimal shutter speeds calculated in the optimal shutter speed calculating step, performing weighted averaging of pixel values of a plurality of frames of input images, and determining pixel values of output image frames.

21. The image processing method according to claim 13, wherein the image generation processing step performs a process of generating an intermediate frame that is not included in frames of input images, and generating images corresponding to the optimal shutter speeds calculated in the optimal shutter speed calculating step in units of the partial areas by applying the intermediate frame.

22. The image processing method according to claim 13, further comprising:
a spatial feature quantity detecting step of detecting a level of spatial contrast in units of the partial areas, this step being performed in a spatial feature quantity detecting unit,
wherein the image generation processing step performs a process of setting a shutter speed higher than the optimal shutter speed calculated according to the movement velocity as an optimal shutter speed in the partial area where the spatial contrast is lower than a predetermined threshold.

23. The image processing method according to claim 13, further comprising:
a spatial feature quantity detecting step of detecting a level of spatial contrast in units of the partial areas, this step being performed in a spatial feature quantity detecting unit,
wherein the image generation processing step performs a process of setting a shutter speed corresponding to a frame rate of input images as an optimal shutter speed without calculating an optimal shutter speed corresponding to the movement velocity in the partial area where the spatial contrast is lower than a predetermined threshold.

24. The image processing method according to any of claims 13 and 14-17,
wherein the degradation of the output images is degradation due to jerkiness and blur, and
wherein the image generation processing step performs a process of obtaining optimal shutter speeds to reduce image degradation due to jerkiness and blur in units of the partial areas and generating images corresponding to the obtained optimal shutter speeds in units of the partial areas.

25. A non-transitory computer readable medium containing a computer program allowing an image processing apparatus to perform image processing on moving images, the program allowing the apparatus to perform:
- a movement velocity calculating step of calculating movement velocities of a subject according to a frame rate of output images in units of partial areas in each frame image constituting the moving images, this step being performed in a movement velocity calculating unit, the movement velocity calculating step including:
  - a block matching step of obtaining motion vectors in units of the partial areas by using a block matching process applying a search frame and a reference frame that are selected from among frames of input images; and
  - a motion vector standardizing step of calculating movement velocities of a subject according to the frame rate of the output images based on motion vector information calculated in the block matching step; and
- an image generation processing step of receiving movement velocity information of the respective partial areas, obtaining optimal imaging shutter speeds that correspond to the movement velocities and that reduce degradation of the output images in units of the partial areas, generating images corresponding to the obtained optimal shutter speeds in units of the partial areas, and outputting each frame image generated by combining the generated partial area images, this step being performed in an image generation processing unit.

* * * * *